(12) United States Patent
Bradshaw

(10) Patent No.: US 11,790,942 B2
(45) Date of Patent: Oct. 17, 2023

(54) PROCESS FOR FORMING MAGNETIC RECORDING LAYER FOR TAPE MEDIA

(71) Applicant: International Business Machines Corporation, Armonk, NY (US)

(72) Inventor: Richard Bradshaw, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 16/546,144

(22) Filed: Aug. 20, 2019

(65) Prior Publication Data

US 2021/0056992 A1 Feb. 25, 2021

(51) Int. Cl.
G11B 5/712 (2006.01)
G11B 5/65 (2006.01)
G11B 5/71 (2006.01)
G11B 5/70 (2006.01)

(52) U.S. Cl.
CPC .............. *G11B 5/712* (2013.01); *G11B 5/65* (2013.01); *G11B 5/7013* (2013.01); *G11B 5/71* (2013.01)

(58) Field of Classification Search
CPC ....... G11B 5/78; G11B 2220/90; G11B 5/133; C08L 2207/53; C08J 3/126
USPC .......... 428/842.2, 842.3; 360/78.02; 427/212
See application file for complete search history.

(56) References Cited

U.S. PATENT DOCUMENTS

| | | |
|---|---|---|
| 3,565,039 A | 2/1971 | Remer |
| 3,859,113 A | 1/1975 | Horvath et al. |
| 4,201,149 A * | 5/1980 | Koester .................. G11B 5/842 118/320 |
| 4,263,188 A | 4/1981 | Hampton et al. |
| 4,568,611 A | 2/1986 | Amirsakis et al. |
| 4,666,773 A * | 5/1987 | Kitamoto ................. G11B 5/70 428/332 |
| 4,699,847 A | 10/1987 | Nakayama et al. |
| 4,966,797 A | 10/1990 | Ishihara et al. |
| 5,051,320 A | 9/1991 | Inaba et al. |
| 5,156,908 A | 10/1992 | Araki et al. |
| 5,446,085 A | 8/1995 | Bradshaw |
| 5,480,716 A | 1/1996 | Naoe et al. |
| 5,532,041 A | 7/1996 | Honjo et al. |
| 5,534,345 A | 7/1996 | Bradshaw |
| 5,543,219 A | 8/1996 | Elwakil |
| 5,594,064 A | 1/1997 | Bradshaw |
| 5,843,565 A | 12/1998 | Davies et al. |

(Continued)

FOREIGN PATENT DOCUMENTS

| | | |
|---|---|---|
| CN | 1320905 A | 11/2001 |
| CN | 1637633 A | 7/2005 |

(Continued)

OTHER PUBLICATIONS

Wu et al., "Organic Phase Syntheses of Magnetic Nanoparticles and Their Applications," Chemical Reviews, vol. 116, No. 18, Jun. 29, 2016, 41 pages.

(Continued)

*Primary Examiner* — Tabassom Tadayyon Eslami
(74) *Attorney, Agent, or Firm* — Zilka-Kotab, P.C.

(57) ABSTRACT

A method, in one approach, includes forming a magnetic recording layer having: encapsulated nanoparticles each comprising a magnetic nanoparticle encapsulated by an encapsulating layer, and a polymeric binder binding the encapsulated nanoparticles.

5 Claims, 12 Drawing Sheets

(56) References Cited

U.S. PATENT DOCUMENTS

| | | |
|---|---|---|
| 6,194,058 B1 | 2/2001 | Isobe et al. |
| 6,254,964 B1* | 7/2001 | Saito .................. G11B 5/70 |
| | | 428/323 |
| 6,451,220 B1 | 9/2002 | Ziolo et al. |
| 6,863,966 B1* | 3/2005 | Hayashi ................ G11B 5/712 |
| | | 428/220 |
| 6,890,631 B2 | 5/2005 | Bradshaw |
| 6,962,644 B2 | 11/2005 | Paterson et al. |
| 6,962,655 B1 | 11/2005 | Gjerstad et al. |
| 6,972,046 B2 | 12/2005 | Sun et al. |
| 6,992,155 B2 | 1/2006 | Okayama et al. |
| 7,128,891 B1 | 10/2006 | Sun |
| 7,128,986 B2 | 10/2006 | Lamberton et al. |
| 7,282,279 B2 | 10/2007 | Murayama et al. |
| 7,687,160 B2 | 3/2010 | Winarski |
| 7,816,023 B2 | 10/2010 | Jensen et al. |
| 7,976,966 B2 | 7/2011 | Winarski |
| 8,241,767 B2 | 8/2012 | Winarski |
| 8,437,104 B2 | 5/2013 | Winarski |
| 8,444,872 B2 | 5/2013 | Ohkoshi et al. |
| 8,465,855 B2 | 6/2013 | Bradshaw et al. |
| 8,507,032 B2 | 8/2013 | Winarski |
| 8,647,757 B2 | 2/2014 | Winarski |
| 8,817,422 B2 | 8/2014 | Winarski |
| 8,926,851 B2 | 1/2015 | Lille et al. |
| 9,036,289 B2 | 5/2015 | Winarski |
| 9,251,822 B2 | 2/2016 | Winarski |
| 9,412,405 B2 | 8/2016 | Kimura et al. |
| 9,633,676 B2 | 4/2017 | Winarski |
| 10,014,014 B1 | 7/2018 | Biskeborn et al. |
| 10,099,941 B2 | 10/2018 | Ohkoshi et al. |
| 10,224,068 B2 | 3/2019 | Winarski |
| 10,783,916 B1 | 9/2020 | Bilich et al. |
| 11,152,027 B2 | 10/2021 | Bradshaw |
| 11,158,337 B2 | 10/2021 | Bradshaw |
| 11,158,339 B2 | 10/2021 | Bradshaw |
| 11,158,340 B2 | 10/2021 | Bradshaw |
| 11,410,697 B2 | 8/2022 | Bradshaw |
| 2002/0012815 A1 | 1/2002 | Veitch et al. |
| 2002/0022130 A1 | 2/2002 | Kohl et al. |
| 2002/0150792 A1 | 10/2002 | Kolb et al. |
| 2003/0152807 A1 | 8/2003 | Soder et al. |
| 2003/0157325 A1 | 8/2003 | Anders et al. |
| 2004/0106009 A1 | 6/2004 | Nakamura et al. |
| 2006/0177705 A1 | 8/2006 | Ahner et al. |
| 2006/0204793 A1 | 9/2006 | Koike et al. |
| 2006/0283290 A1 | 12/2006 | Hattori et al. |
| 2007/0065682 A1 | 3/2007 | Waki |
| 2007/0127158 A1* | 6/2007 | Tran .................. G11B 5/725 |
| | | 360/134 |
| 2007/0166571 A1 | 7/2007 | Meguro et al. |
| 2007/0231610 A1 | 10/2007 | Waki et al. |
| 2007/0287032 A1 | 12/2007 | Nakai et al. |
| 2008/0305366 A1 | 12/2008 | Hsieh et al. |
| 2009/0053512 A1 | 2/2009 | Pyun et al. |
| 2009/0135527 A1 | 5/2009 | Lee et al. |
| 2009/0136783 A1 | 5/2009 | Jingu et al. |
| 2009/0174970 A1 | 7/2009 | Inoue et al. |
| 2010/0014187 A1 | 1/2010 | Winarski |
| 2010/0015472 A1* | 1/2010 | Bradshaw ............... H01F 1/061 |
| | | 428/846 |
| 2010/0301462 A1 | 12/2010 | Sinha et al. |
| 2011/0195277 A1 | 8/2011 | Osaka et al. |
| 2011/0229739 A1 | 9/2011 | Jensen et al. |
| 2014/0146414 A1 | 5/2014 | Winarski |
| 2014/0231383 A1 | 8/2014 | Gurney et al. |
| 2015/0064500 A1 | 3/2015 | Aoshima et al. |
| 2015/0221330 A1 | 8/2015 | Gurney et al. |
| 2015/0262742 A1 | 9/2015 | Hellman et al. |
| 2016/0027460 A1 | 1/2016 | Boday et al. |
| 2016/0140991 A1 | 5/2016 | Chen et al. |
| 2016/0284450 A1 | 9/2016 | Aoshima et al. |
| 2017/0194026 A1 | 7/2017 | Kimura et al. |
| 2017/0321018 A1 | 11/2017 | Viala |
| 2018/0079139 A1 | 3/2018 | Wang et al. |
| 2018/0358046 A1 | 12/2018 | Shirata et al. |
| 2020/0126588 A1 | 4/2020 | Miura et al. |
| 2021/0056985 A1 | 2/2021 | Bradshaw |
| 2021/0056990 A1 | 2/2021 | Bradshaw |
| 2021/0056993 A1 | 2/2021 | Bradshaw |
| 2021/0056994 A1 | 2/2021 | Bradshaw |
| 2021/0056995 A1 | 2/2021 | Bradshaw |
| 2021/0056996 A1 | 2/2021 | Bradshaw |
| 2021/0390980 A1 | 12/2021 | Bradshaw |
| 2022/0343945 A1 | 10/2022 | Bradshaw |

FOREIGN PATENT DOCUMENTS

| | | |
|---|---|---|
| CN | 1925011 A | 3/2007 |
| CN | 101945963 A | 1/2011 |
| CN | 102985492 A | 3/2013 |
| CN | 104620316 A | 5/2015 |
| CN | 109478410 A | 3/2019 |
| EP | 1515348 A2 | 3/2005 |
| GB | 2512467 B | 2/2016 |
| JP | 357111832 * | 7/1982 |
| JP | 410269558 * | 10/1998 |
| JP | 2000082204 A | 3/2000 |
| JP | 2005025816 A | 1/2005 |
| JP | 2006302471 A | 11/2006 |
| JP | 2016042399 A | 3/2016 |
| JP | 2017041293 A | 2/2017 |
| WO | 09323795 * | 11/1993 |
| WO | 009323795 * | 11/1993 |
| WO | 9323795 A1 | 11/1993 |
| WO | 2010098633 A3 | 12/2010 |

OTHER PUBLICATIONS

Chang, E., "Magnetic Data Storage and Nanoparticles," Semantic Scholar, 2002, 8 pages, retrieved from https://www.semanticscholar.org/paper/Magnetic-Data-Storage-and-Nanoparticles-Chang/69a2fda3dd8e2c60734a893e8b77a84f384ff252.

Hershkovits et al., "Adsorption of Block Copolymers from Selective Solvents on Curved Surfaces," National Institutes of Health, Macromolecules, vol. 41, No. 9, May 13, 2008, pp. 1-26.

Xie et al., "Surface-Engineered Magnetic Nanoparticle Platforms for Cancer Imaging and Therapy," National Institutes of Health, Accounts of Chemical Research, Issue 44, No. 10, Oct. 18, 2011, pp. 1-20.

Lu et al., "Magnetic Nanoparticles: Synthesis, Protection, Functionalization, and Application," Angewandte Chemie International Edition, vol. 46, 2007, pp. 1222-1244.

Teja et al., "Synthesis, properties, and applications of magnetic iron oxide nanoparticles," Progress in Crystal Growth and Characterization of Materials, vol. 55, 2009, pp. 22-45.

Farhadi et al., "Synthesis, characterization, and investigation of optical and magnetic properties of cobalt oxide (Co3O4) nanoparticles," Journal of Nanostructure in Chemistry, vol. 3, No. 69, 2013, pp. 1-9.

Zhang, L., "On the Chemical Synthesis of Manganese-Based High Magneocrystalline Anisotropy Energy Density Magnetic Nanoparticles," University of Alabama, Dissertation, 2013, pp. 1-140.

Arkhipov et al., "Investigation into Chromium Dioxide Nanopowders Obtained under Hydrothermal Conditions in the Presence of Molybdenum and Antimony Modifiers," Nanotechnologies in Russia, vol. 10, No. 1-2, 2015, pp. 60-61.

Bahari et al., "Low temperature synthesis of La2O3 and CrO2 by Sol-Gel process," Journal of Engineering and Technology Research, vol. 3, No. 7, Jul. 2011, pp. 203-208.

Jaswal et al., "Synthesis and Characterization of Chromium Oxide Nanoparticles," Oriental Journal of Chemistry, vol. 30, No. 2, 2014, pp. 559-566.

Tannenbaum et al., "FTIR Characterization of the Reactive Interface of Cobalt Oxide Nanoparticles Embedded in Polymeric Matrices," Journal of Physical Chemistry, vol. 110, No. 5, 2006, pp. 2227-2232.

Eric et al., "Triboelectrification of Materials Used in Tape Heads," Journal of Electrostatics, vol. 64, Issue 11, Oct. 2006, pp. 1-30, retrieved from https://www.sciencedirect.com/science/article/abs/pii/S0304388606000477.

(56) References Cited

OTHER PUBLICATIONS

Diaz et al., "A semi-quantitative tribo-electric series for polymeric materials: the influence of chemical structure and properties," Journal of Electrostatics, No. 62, 2004, pp. 277-290.
Roca et al., "Structural and magnetic properties of uniform magnetite nanoparticles prepared by high temperature decomposition of organic precursors," Institute of Physics Publishing, Nanotechnology, No. 17, 2006, pp. 2783-2788.
Pan et al., "Fundamental theories and basic principles of triboelectric effect: A review," Friction, vol. 7, No. 1, 2019, pp. 2-17.
Ciprari et al., "Characterization of Polymer Nanocomposite Interphase and Its Impact on Mechanical Properties," American Chemical Society, Macromolecules, vol. 39, 2006, pp. 6565-6573.
Xu et al., "Encapsulation of nanosized magnetic iron oxide by polyacrylamide via inverse miniemulsion polymerization," Journal of Magnetism and Magnetic Materials, vol. 277, 2004, pp. 136-143.
Zalich et al., "Structural and Magnetic Properties of Cobalt Nanoparticles Encased in Siliceous Shells," American Chemical Society, Chemistry of Materials, vol. 19, Nov. 30, 2007, pp. 6597-6604.
Korth et al., "Polymer-Coated Ferromagnetic Colloids from Well-Defined Macromolecular Surfactants and Assembly into Nanoparticle Chains," Journal of the American Chemical Society, vol. 128, 2006, pp. 6562-6563.
Bradshaw, R., U.S. Appl. No. 16/546,123, filed Aug. 20, 2019.
Bradshaw, R., U.S. Appl. No. 16/546,161, filed Aug. 20, 2019.
Bradshaw, R., U.S. Appl. No. 16/546,173, filed Aug. 20, 2019.
Bradshaw, R., U.S. Appl. No. 16/545,963, filed Aug. 20, 2019.
Bradshaw, R., U.S. Appl. No. 16/546,057, filed Aug. 20, 2019.
Bradshaw, R., U.S. Appl. No. 16/545,923, filed Aug. 20, 2019.
List of IBM Patents Or Patent Applications Treated As Related.
International Search Report and Written Opinion from PCT Application No. PCT/IB2020/057359, dated Nov. 19, 2020.
International Search Report and Written Opinion from PCT Application No. PCT/IB2020/057357, dated Nov. 19, 2020.
International Search Report and Written Opinion from PCT Application No. PCT/IB2020/057358, dated Nov. 3, 2020.
Non-Final Office Action from U.S. Appl. No. 16/546,173, dated Sep. 29, 2020.
Non-Final Office Action from U.S. Appl. No. 16/546,057, dated Oct. 1, 2020.
Office Action from Chinese Patent Application No. 202080053506.2, dated Mar. 6, 2023.
Non-Final Office Action from U.S. Appl. No. 16/545,963, dated Feb. 2, 2021.
Non-Final Office Action from U.S. Appl. No. 16/546,123, dated Feb. 2, 2021.
Non-Final Office Action from U.S. Appl. No. 16/546,161, dated Feb. 2, 2021.
Final Office Action from U.S. Appl. No. 16/546,173, dated Mar. 10, 2021.
Final Office Action from U.S. Appl. No. 16/546,057, dated Mar. 9, 2021.
Final Office Action from U.S. Appl. No. 16/546,057, dated Apr. 8, 2021.
Advisory Action from U.S. Appl. No. 16/546,173, dated May 17, 2021.
Notice of Allowance from U.S. Appl. No. 16/545,963, dated Jun. 17, 2021.
Notice of Allowance from U.S. Appl. No. 16/546,161, dated Jun. 18, 2021.
Notice of Allowance from U.S. Appl. No. 16/546,123, dated Jun. 21, 2021.
Notice of Allowance from U.S. Appl. No. 16/545,923, dated Jun. 24, 2021.
Supplemental Notice of Allowance from U.S. Appl. No. 16/545,963, dated Jun. 30, 2021.
Corrected Notice of Allowance from U.S. Appl. No. 16/545,963, dated Jul. 16, 2021.
Corrected Notice of Allowance from U.S. Appl. No. 16/546,123, dated Aug. 5, 2021.
Corrected Notice of Allowance from U.S. Appl. No. 16/546,161, dated Aug. 5, 2021.
Supplemental Notice of Allowance from U.S. Appl. No. 16/545,923, dated Aug. 13, 2021.
Corrected Notice of Allowance from U.S. Appl. No. 16/545,923, dated Aug. 25, 2021.
Corrected Notice of Allowance from U.S. Appl. No. 16/545,963, dated Aug. 25, 2021.
Corrected Notice of Allowance from U.S. Appl. No. 16/546,161, dated Aug. 25, 2021.
Bradshaw, R., U.S. Appl. No. 17/459,659, filed Aug. 27, 2021.
Non-Final Office Action from U.S. Appl. No. 16/546,173, dated Sep. 15, 2021.
IBM, List of IBM Patents Or Patent Applications Treated As Related, dated Sep. 28, 2021, 2 pages.
Corrected Notice of Allowance from U.S. Appl. No. 16/546,123, dated Aug. 25, 2021.
Examiner's Answer to Appeal Brief from U.S. Appl. No. 16/546,057, dated Nov. 5, 2021.
Free Dictionary, "Cure," Definition, 10 pages, retrieved on Oct. 25, 2021, from https://www.thefreedictionary.com/cure.
Notice of Allowance from U.S. Appl. No. 16/546,173, dated Mar. 30, 2022.
Examination Report from European Application No. GB2201988.9, dated May 4, 2022.
Bradshaw, R., U.S. Appl. No. 17/858,572, filed Jul. 6, 2022.
IBM, List of IBM Patents Or Patent Applications Treated As Related, dated Jul. 13, 2022, 2 pages.
Supplemental Notice of Allowance from U.S. Appl. No. 16/546,173, dated Jul. 5, 2022.
Response to Examination Report from European Application No. GB2201988.9, dated Aug. 18, 2022, 7 pages.
Non-Final Office Action from U.S. Appl. No. 17/459,659, dated Sep. 26, 2022.
Non-Final Office Action from U.S. Appl. No. 17/858,572, dated Nov. 4, 2022.
Office Action from Chinese Patent Application No. 202080053501.X, dated Feb. 11, 2023.
Office Action from Chinese Patent Application No. 202080053532.5, dated Feb. 14, 2023.
Final Office Action from U.S. Appl. No. 17/459,659, dated Feb. 27, 2023.
Office Action from Chinese Patent Application No. 202080053501.X, dated Mar. 23, 2023.
Final Office Action from U.S. Appl. No. 17/858,572, dated Apr. 7, 2023.
Patent Board Decision on Appeal from U.S. Appl. No. 16/546,057, dated Apr. 13, 2023.
Notice of Allowance from U.S. Appl. No. 17/459,659, dated May 3, 2023.
Notice of Allowance from U.S. Appl. No. 17/459,659, dated Jun. 12, 2023.
Advisory Action from U.S. Appl. No. 17/858,572, dated Jun. 16, 2023.
Corrected Notice of Allowance from U.S. Appl. No. 17/459,659, dated Jul. 3, 2023.

* cited by examiner

PROCESS FOR FORMING MAGNETIC
RECORDING LAYER FOR TAPE MEDIA

BACKGROUND

The present invention relates to data storage systems, and more particularly, this invention relates to magnetic recording layers for tape media.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various challenges ranging from the design of tape head assemblies for use in such systems to dealing with tape dimensional instability.

SUMMARY

A method, in one approach, includes forming a magnetic recording layer having: encapsulated nanoparticles each comprising a magnetic nanoparticle encapsulated by an encapsulating layer, and a polymeric binder binding the encapsulated nanoparticles. Fabrication of a recording layer according to the approaches disclosed herein result in magnetic recording products having, but not limited to, one or more of: thinner recording layer, more uniform magnetic particle dispersion, smoother, less turbid interface between the underlayer and recording layer, higher glass transition temperature, lower occurrence or essential elimination of voids of magnetic particles in the recording layer, etc. Each of these benefits results in a magnetic recording product, such as tape, that exhibits characteristics such as, but not limited to, one or more of: improved tear resistance, higher recording resolution down to and below 1 nm, lower noise resulting in a higher signal to noise ratio, etc.

In one aspect, forming the recording layer includes spray coating a mixture of the magnetic nanoparticles, an aromatic polymer, and the polymeric binder onto a structure. Spray coating provides fast, uniform application without streaks typical of brush coating or chunks typical of blade coating.

In one aspect, forming the recording layer includes radiating a mixture comprising the magnetic nanoparticles and an aromatic polymer for causing the aromatic polymer to crosslink, thereby forming the encapsulating layer around the magnetic nanoparticles. This ensures a fast, consistent cure throughout the recording layer that was unachievable in prior generations of tape due to the thickness of the recording layer, and the consequent inability of the radiation to penetrate the recording layer evenly.

In one aspect, an average thickness of each encapsulating layer is less than 1 nanometer. Such thin shells improve magnetic particle packing density in the recording layer, and thus enable higher recorded bit resolution.

In one aspect, the method includes forming an underlayer, the recording layer being formed on the underlayer. Preferably, the recording layer is substantially not intermixed with the underlayer after formation of the recording layer. This feature overcomes a longstanding problem in magnetic recording tape products, namely intermixing of the layers at their interface and the well known problems such intermixing creates.

In one aspect, the underlayer is electrically conductive. The electrically conductive characteristic of the underlayer assists in dissipating the charge, e.g., by transporting the charge to a hub coupled to a ground, thereby minimizing charge traveling into the head and consequently lessening the risk of condensed liquid water forming a conductive path between the tape and head surface that provides a path for the electrochemical corrosion of the recording head structures.

In a preferred aspect, the recording layer is part of a magnetic recording tape.

A method according to another approach includes creating a suspension of magnetic nanoparticles and an aromatic polymer. The suspension is mixed with a polymeric binder and a solvent to form a mixture. The mixture is applied onto a structure. The applied mixture is at least partially dried, and cured. Fabrication of a recording layer according to the approaches disclosed herein result in magnetic recording products having, but not limited to, one or more of: thinner recording layer, more uniform magnetic particle dispersion, smoother, less turbid interface between the underlayer and recording layer, higher glass transition temperature, lower occurrence or essential elimination of voids of magnetic particles in the recording layer, etc. Each of these benefits results in a magnetic recording product, such as tape, that exhibits characteristics such as, but not limited to, one or more of: improved tear resistance, higher recording resolution down to and below 1 nm, lower noise resulting in a higher signal to noise ratio, etc.

Other aspects and approaches of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses various configurations of layers particularly useful in magnetic recording media, as well as methods for forming the layers.

In one general approach, a method includes forming a magnetic recording layer having: encapsulated nanoparticles each comprising a magnetic nanoparticle encapsulated by an encapsulating layer, and a polymeric binder binding the encapsulated nanoparticles.

In another general approach, a method includes creating a suspension of magnetic nanoparticles and an aromatic polymer. The suspension is mixed with a polymeric binder and a solvent to form a mixture. The mixture is applied onto a structure. The applied mixture is at least partially dried, and cured.

Illustrative Operating Environment

Figure 1A:
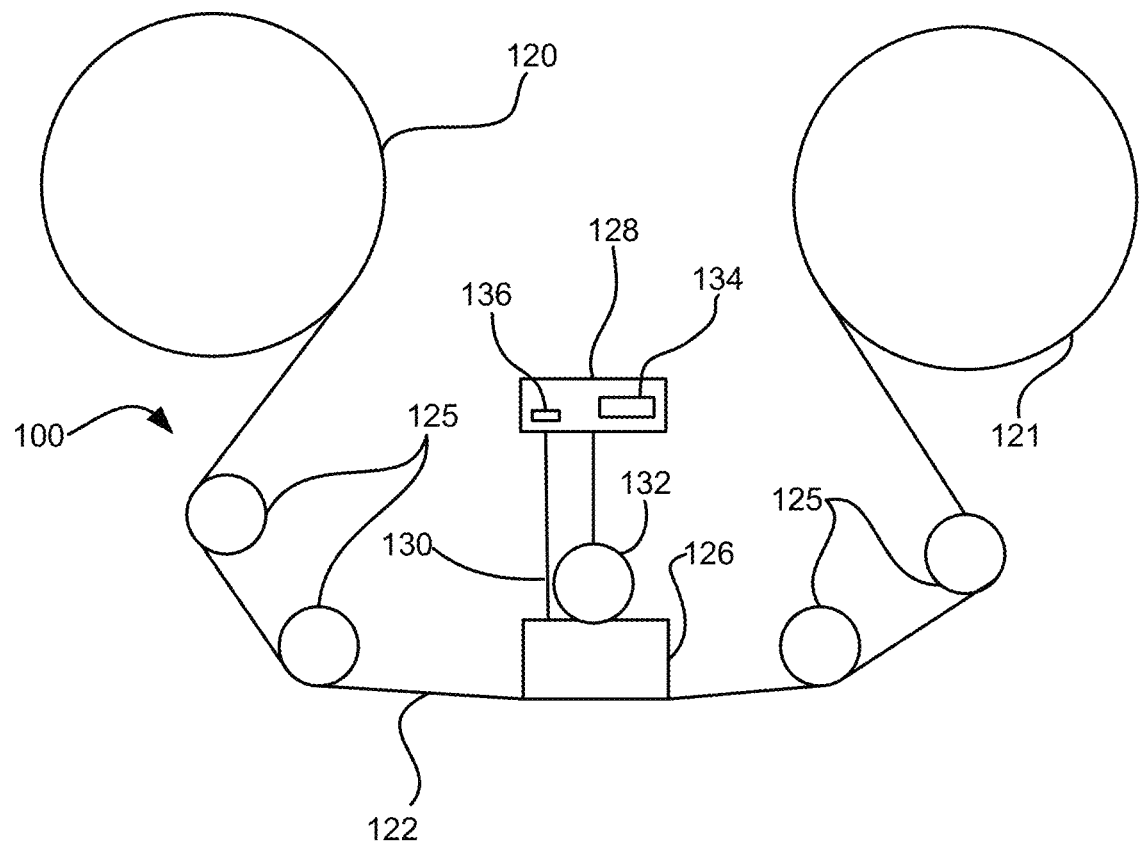
FIG. 1A is a schematic diagram of a simplified tape drive system.

FIG. 1A illustrates a simplified tape drive 100 of a tape-based data storage system, which may be employed in the context of the present invention. While one specific implementation of a tape drive is shown in FIG. 1A, it should be noted that the approaches described herein may be implemented in the context of any type of tape drive system.

As shown, a tape supply cartridge 120 and a take-up reel 121 are provided to support a tape 122. One or more of the reels may form part of a removable cartridge and are not necessarily part of the tape drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various approaches. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the tape head 126 to be recorded on the tape 122 and to receive data read by the tape head 126 from the tape 122. An actuator 132 controls position of the tape head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
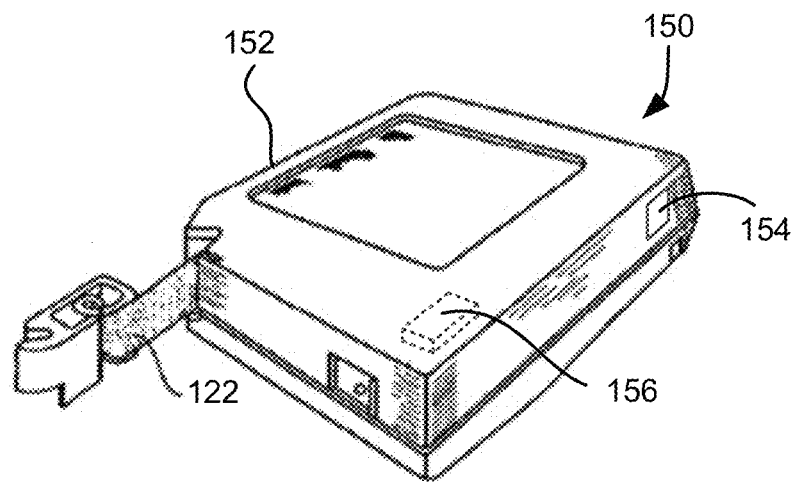
FIG. 1B is a schematic diagram of a tape cartridge according to one aspect of the present invention.

FIG. 1B illustrates an exemplary tape cartridge 150, which in various approaches may include any configuration of the magnetic recording media described herein in tape form. Such tape cartridge 150 may be used with a system such as that shown in FIG. 1A. As shown, the tape cartridge 150 includes a housing 152, a tape 122 in the housing 152, and an optional nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred approach, the nonvolatile memory 156 may be solid state memory (e.g., Flash memory), read-only memory (ROM) device, etc., embedded into or coupled to the inside or outside of the tape cartridge 150. The nonvolatile memory is accessible by the tape drive and the tape operating software (the driver software), and/or another device.

Figure 2A:
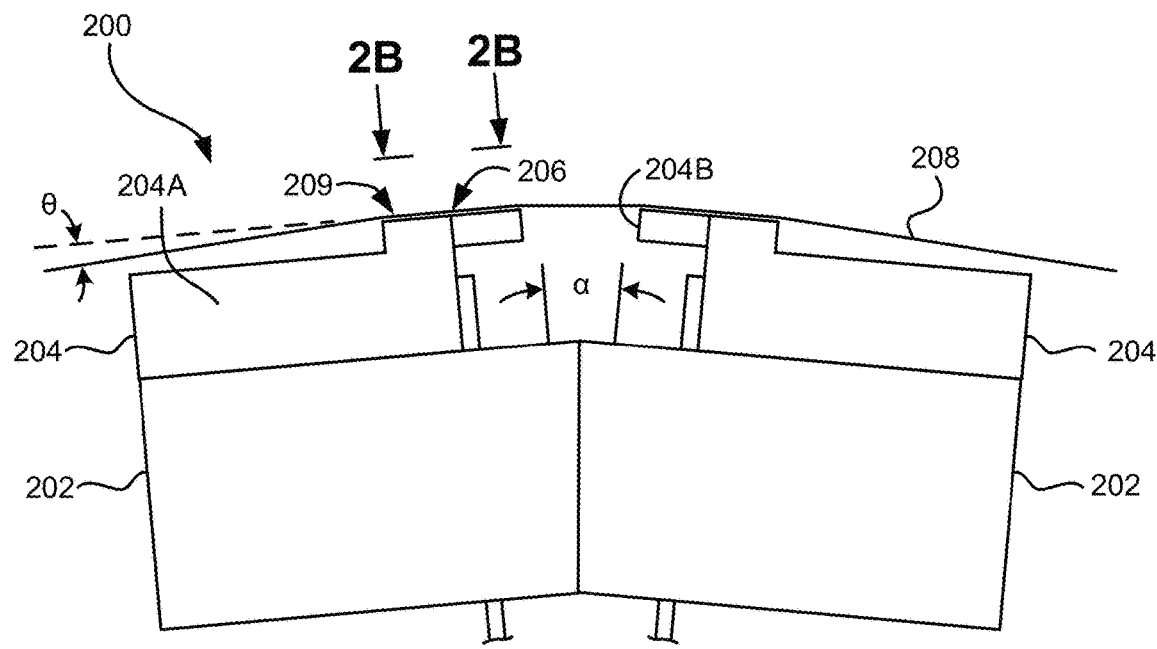
FIG. 2A illustrates a side view of a flat-lapped, bi-directional, two-module magnetic tape head according to one aspect of the present invention.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2B:
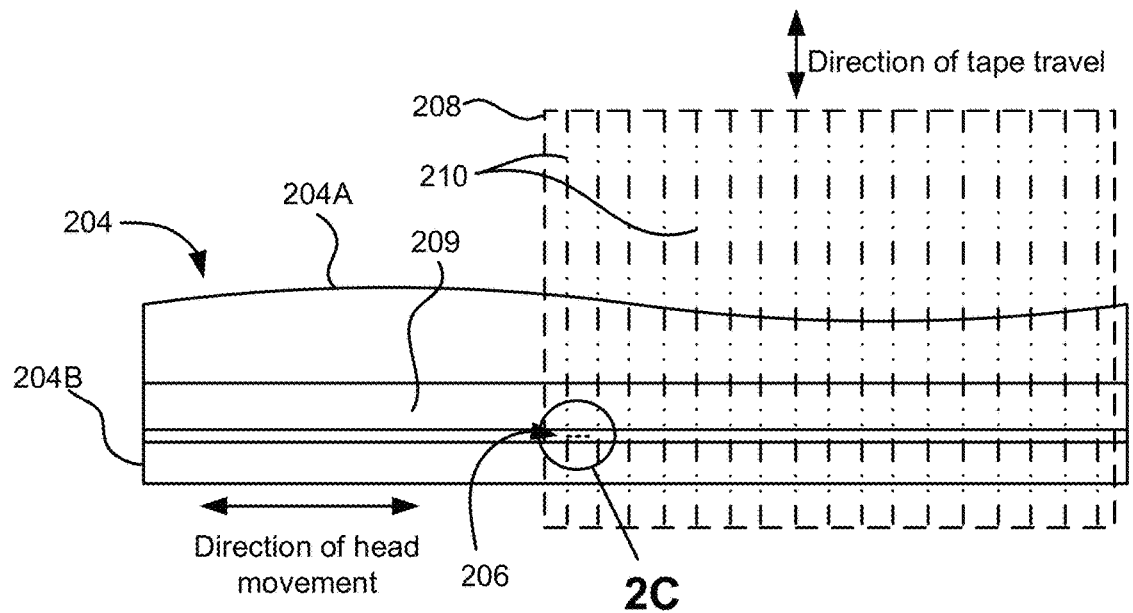
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2C:
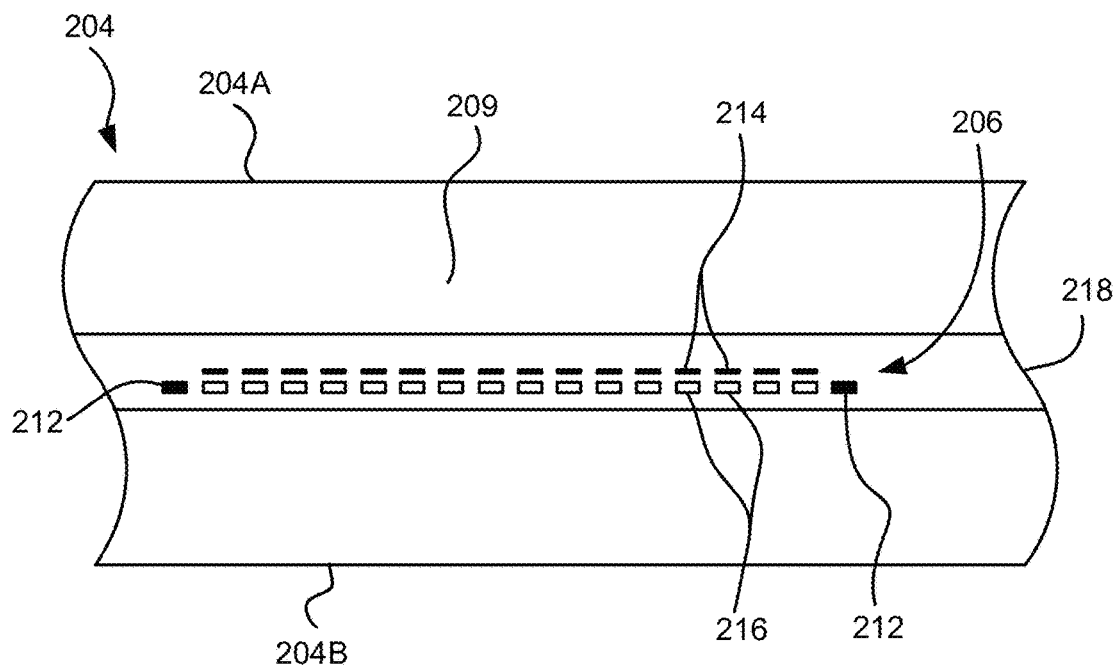
FIG. 2C is a detailed view taken from Circle 2C of FIG. 2B.

FIG. 2C depicts a plurality of readers and/or writers 206 formed in a gap 218 on the module 204 in Circle 2C of FIG. 2B. As shown, the array of readers and writers 206 includes, for example, 16 writers 214, 16 readers 216 and two servo readers 212, though the number of elements may vary. Illustrative approaches include 8, 16, 32, 40, and 64 active readers and/or writers 206 per array, and alternatively interleaved designs having odd numbers of reader or writers such as 17, 25, 33, etc. An illustrative approach includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2C, the readers 216 and writers 214 may also be arranged in an interleaved configuration. Alternatively, each array of readers and/or writers 206 may be readers or writers only, and the arrays may contain one or more servo readers 212. As noted by considering FIGS. 2A and 2B-2C together, each module 204 may include a complementary set of readers and/or writers 206 for such things as bi-directional reading and writing, read-while-write capability, backward compatibility, etc.

Figure 2D:
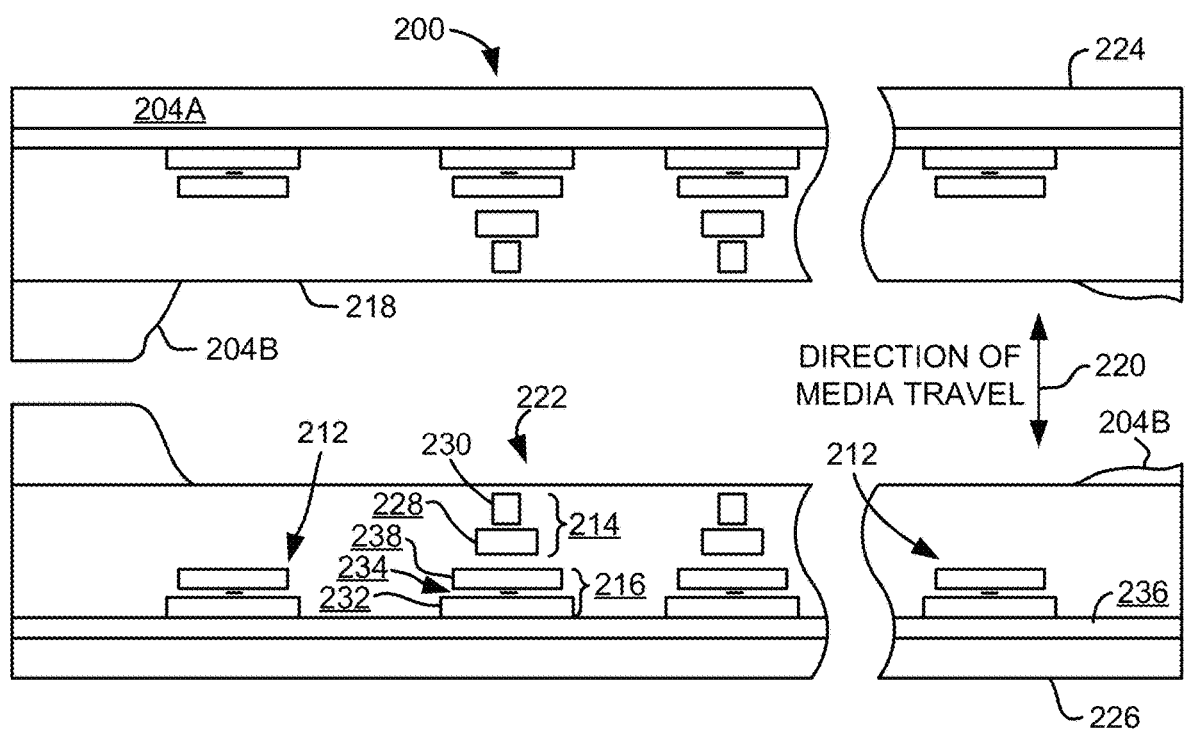
FIG. 2D is a detailed view of a partial tape bearing surface of a pair of modules.

FIG. 2D shows a partial tape bearing surface view of complementary modules of a magnetic tape head 200 according to one approach. In this approach, each module has a plurality of read/write (R/W) pairs in a piggyback configuration formed on a common substrate 204A and an optional electrically insulative insulating layer 236. The writers 214 and the readers 216 are aligned parallel to an intended direction of travel of a tape medium thereacross to form an R/W pair, exemplified by R/W pairs 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a magnetic tape head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (—), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer poles 228, 230, and a coil (not shown). The sensor may be of any known type, including those based on magnetoresistive (MR), GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
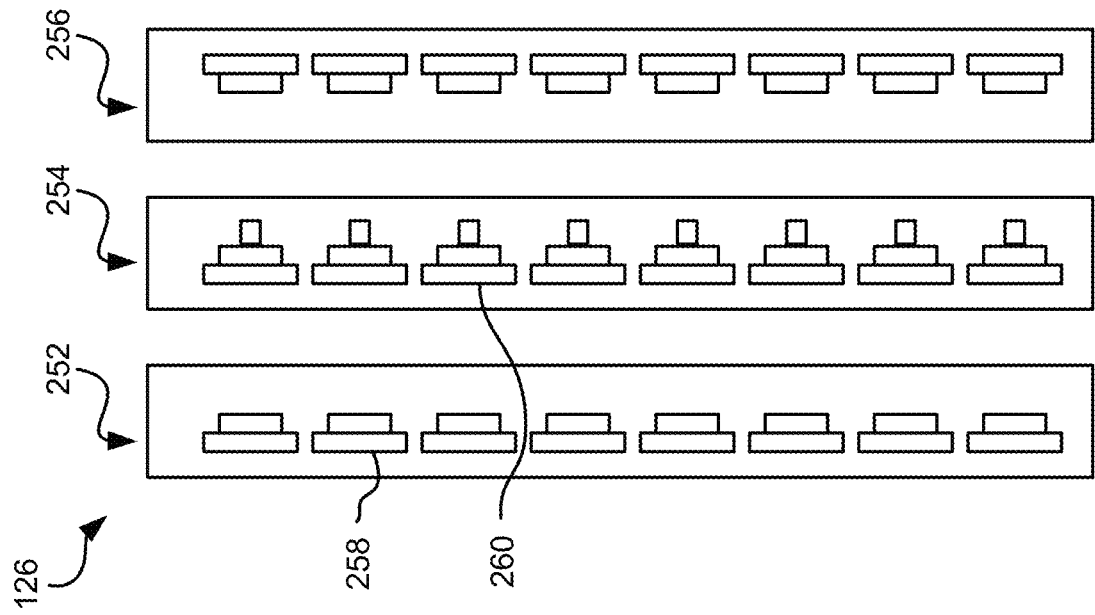
FIG. 4 is a partial tape bearing surface view of a magnetic head having a read-write-read configuration.
Figure 3:
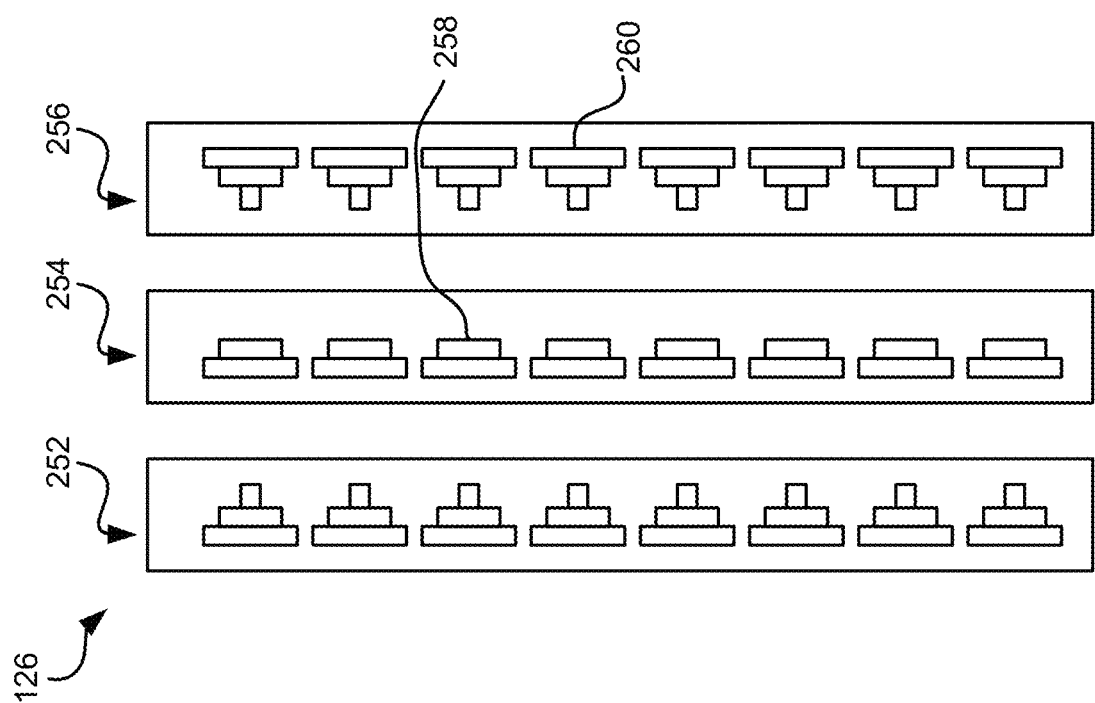
FIG. 3 is a partial tape bearing surface view of a magnetic head having a write-read-write configuration.

The configuration of the tape head 126 may include multiple module, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify aspects of the present invention. One skilled in the art apprised with the teachings herein will appreciate how permutations of the present invention would apply to configurations other than a W-R-W configuration.

Figure 5:
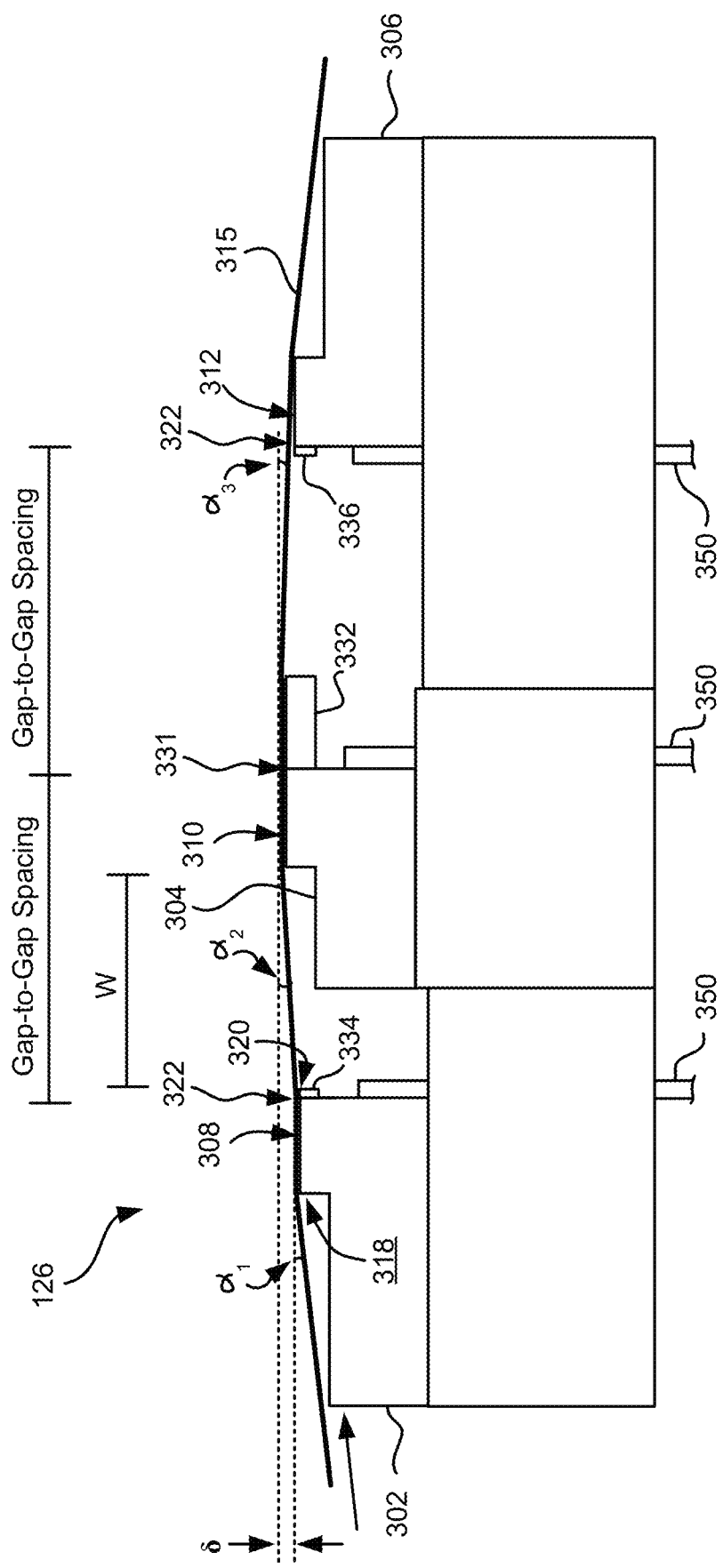
FIG. 5 is a side view of a magnetic tape head with three modules where the modules all generally lie along about parallel planes.

FIG. 5 illustrates a magnetic head 126 according to one approach that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
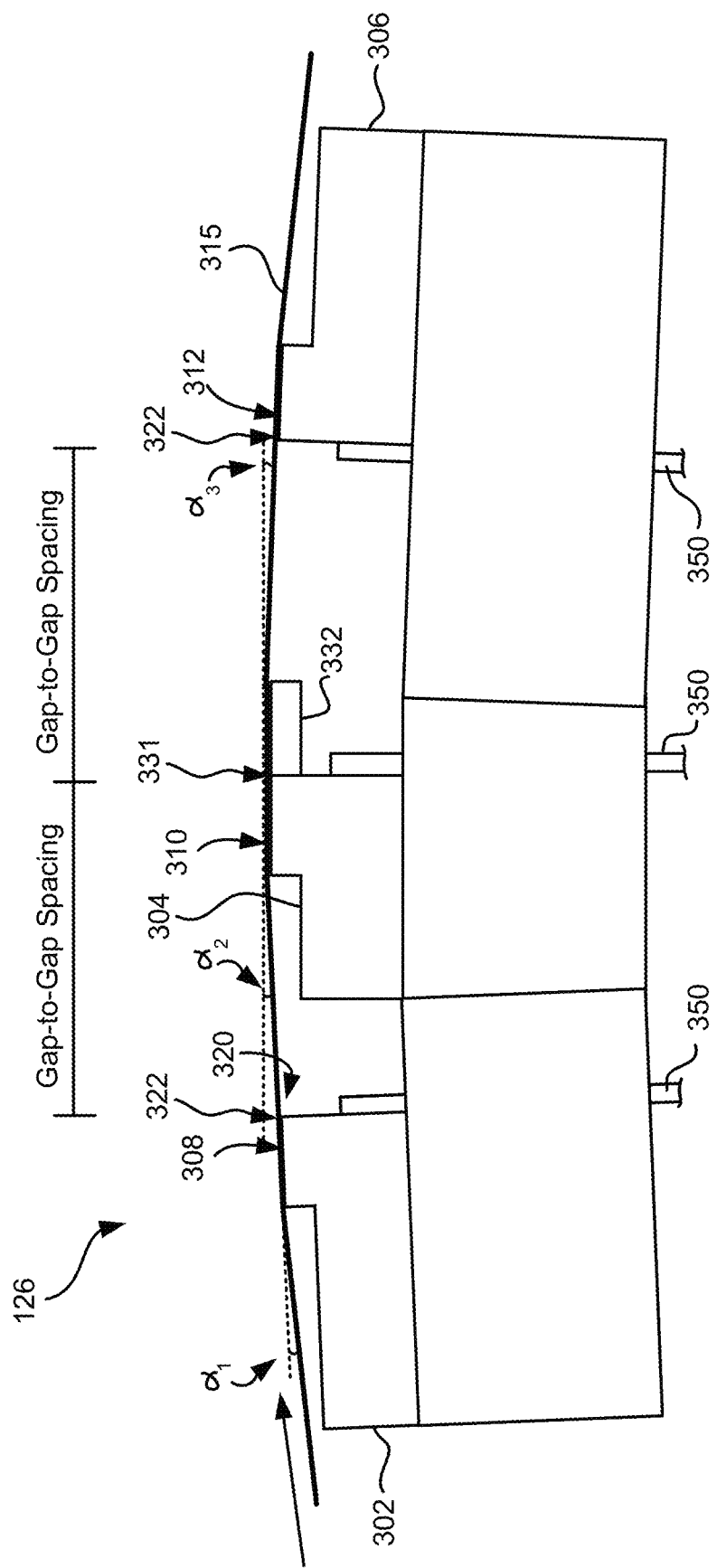
FIG. 6 is a side view of a magnetic tape head with three modules in a tangent (angled) configuration.

In one approach, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by a skiving edge 318 of the leading module 302 has been found by experimentation to be sufficient to keep the tape adhered to the tape bearing surface 308 of the leading module 302. A trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, transducers 322 may be located near the trailing edges of the outer modules 302, 306. These approaches are particularly adapted for write-read-write applications.

A benefit of this and other aspects described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one approach, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some approaches, the second module 304 has a closure, while the first and third modules 302, 306 do not have a closure. Where there is no closure, preferably a hard coating is added to the module. One preferred coating is diamond-like carbon (DLC).

In the approach shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some approaches is ideal for stabilizing tape motion over the second module 304.

Depending on tape tension and stiffness, it may be desirable to angle the tape bearing surfaces of the outer modules relative to the tape bearing surface of the second module. FIG. 6 illustrates an apparatus where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this approach, thereby reducing wear on the elements in the trailing module 306. These approaches are particularly useful for write-read-write applications. Additional aspects of these approaches are similar to those given above.

Typically, the tape wrap angles may be set about midway between the approaches shown in FIGS. 5 and 6.

Figure 7:
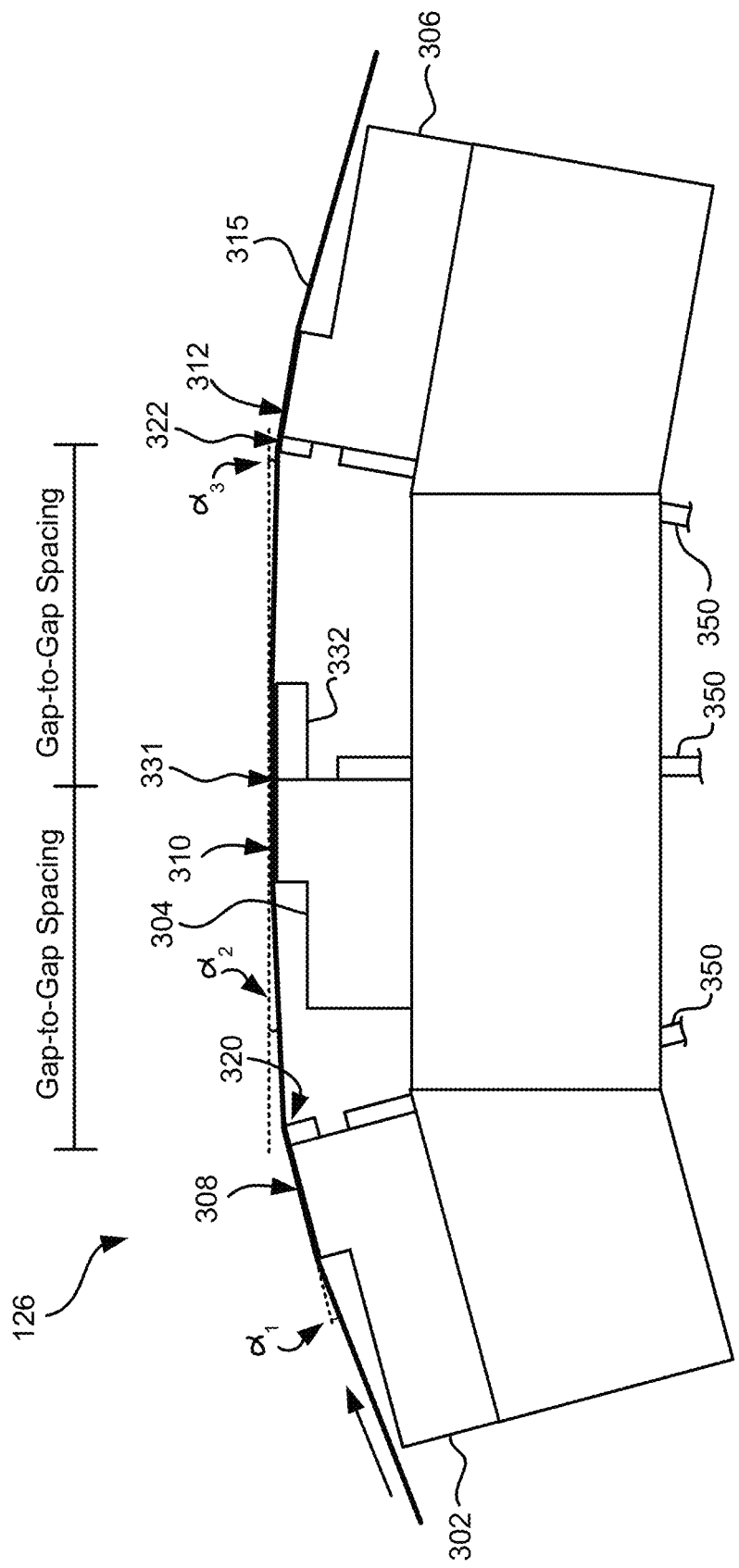
FIG. 7 is a side view of a magnetic tape head with three modules in an overwrap configuration.

FIG. 7 illustrates an apparatus where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this approach, the tape does not pop off of the trailing module, allowing it to be used for writing or reading. Accordingly, the leading and middle modules can both perform reading and/or writing functions while the trailing module can read any just-written data. Thus, these approaches are preferred for write-read-write, read-write-read, and write-write-read applications. In the latter approaches, closures should be wider than the tape canopies for ensuring read capability. The wider closures may require a wider gap-to-gap separation. Therefore, a preferred approach has a write-read-write configuration, which may use shortened closures that thus allow closer gap-to-gap separation.

Additional aspects of the approaches shown in FIGS. 6 and 7 are similar to those given above.

A 32 channel version of a multi-module tape head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the approaches described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various approaches in conformance with the teachings herein, as would become apparent to one skilled in the art upon reading the present disclosure.

Figure 8A:
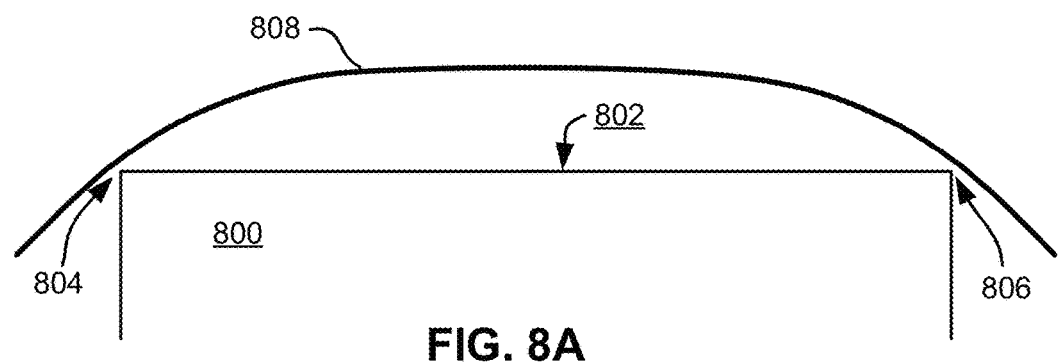
FIGS. 8A-8C are schematics depicting the principles of tape tenting.
Figure 8B:
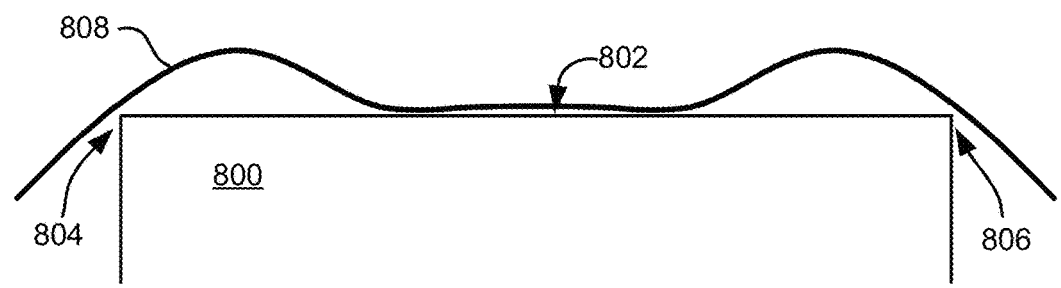
Figure 8C:
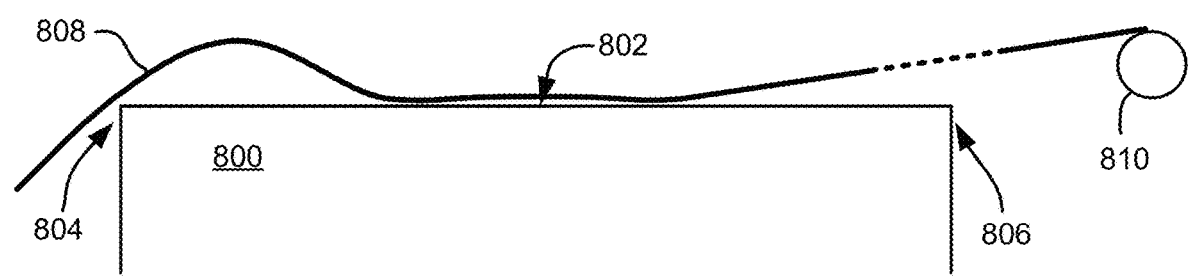

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various aspects described herein can be implemented with a wide range of file system formats, including for example IBM Spectrum Archive Library Edition (LTFS LE). However, to provide a context, and solely to assist the reader, some of the approaches below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
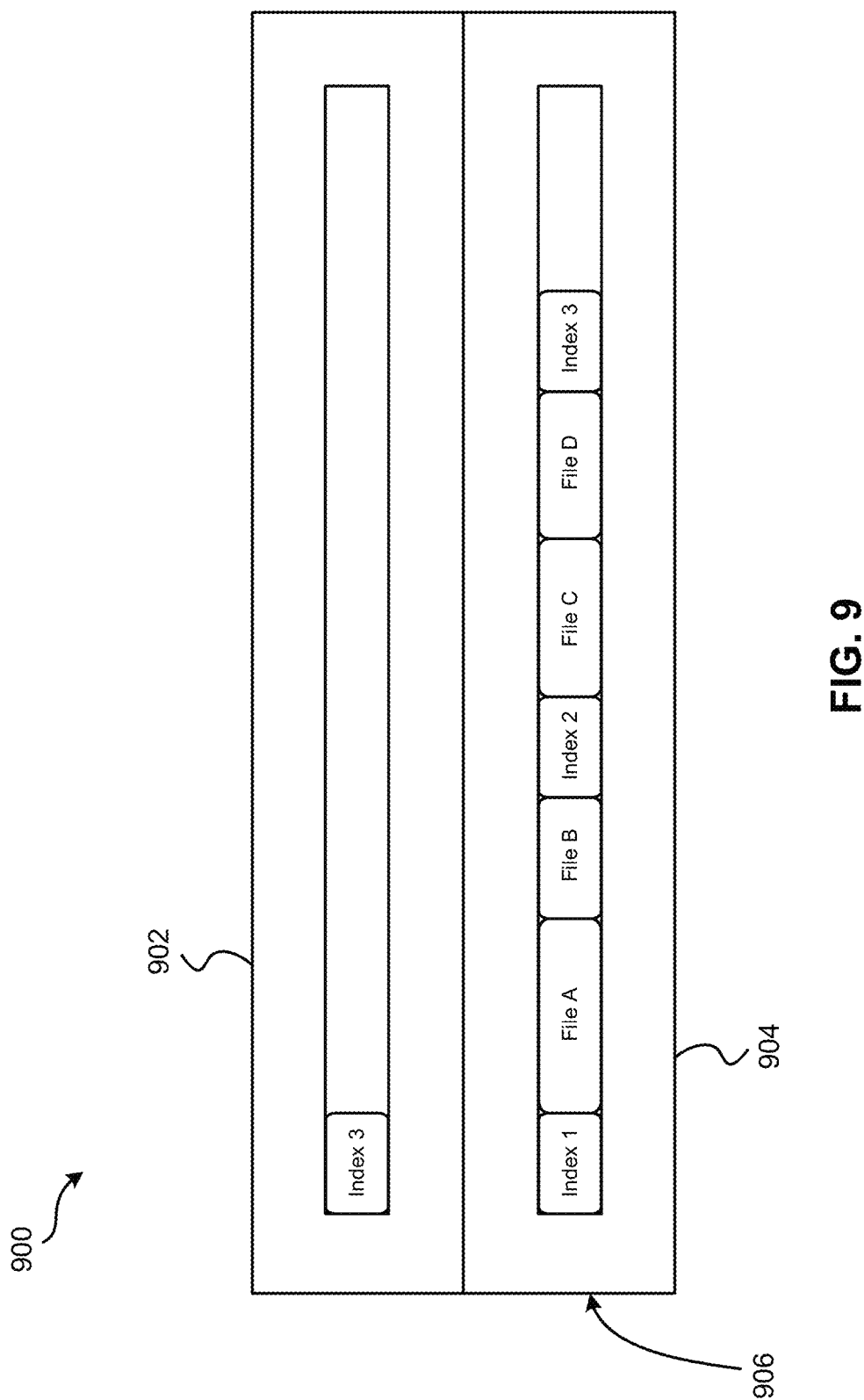
FIG. 9 is a representational diagram of files and indexes stored on a magnetic tape in accordance with one aspect of the present invention.

Looking to FIG. 9, a magnetic tape 900 having an index partition 902 and a data partition 904 is illustrated according to one approach. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired approach. According to some approaches, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

Magnetic Recording Media and Fabrication of Layers Thereof

Figure 10:
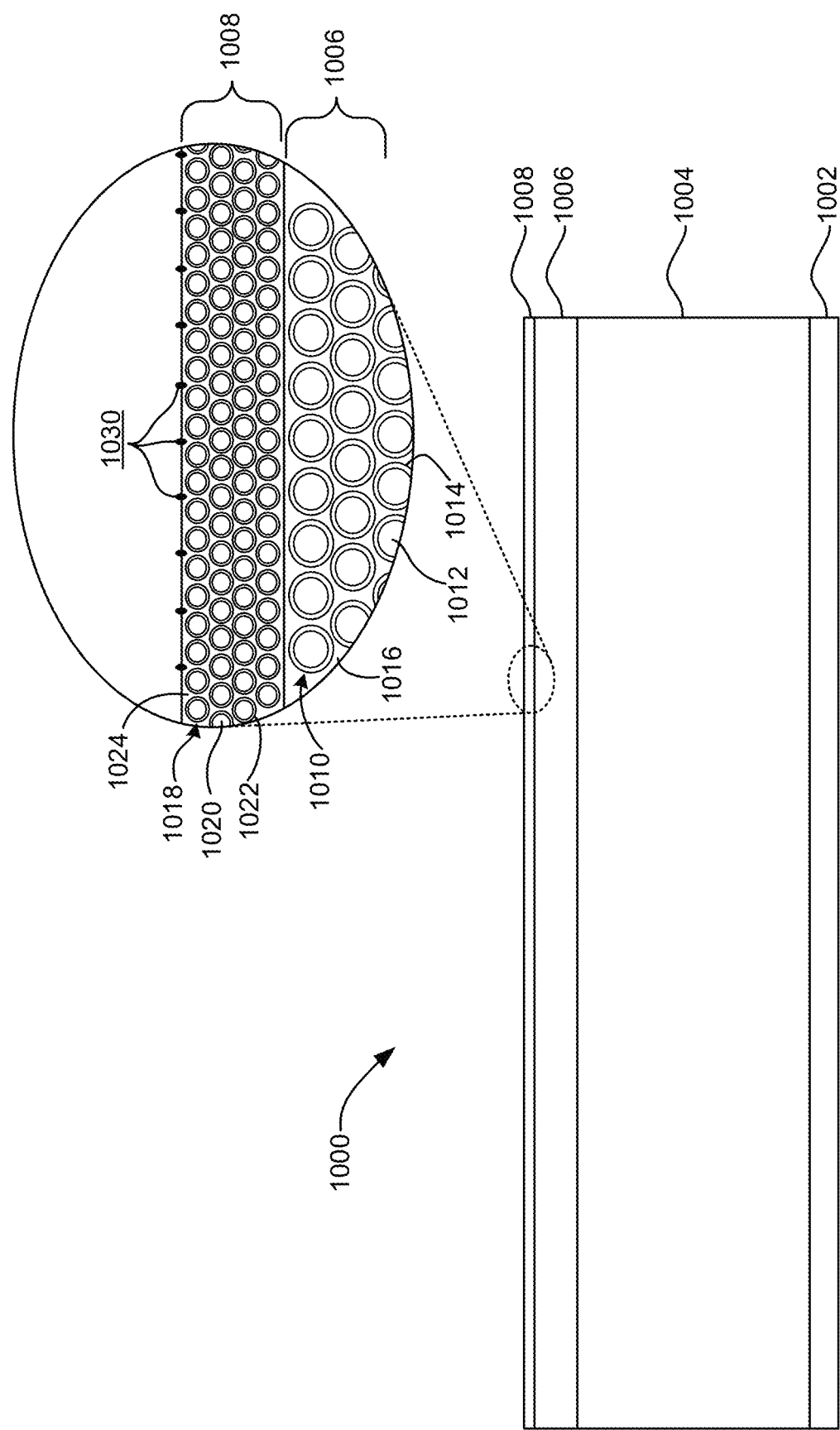
FIG. 10 is a partial cross-sectional view of the basic structure of a magnetic recording medium, in accordance with various approaches.

FIG. 10 depicts a partial cross-sectional view of the basic structure of a magnetic recording medium 1000, not to scale, in accordance with various approaches described herein. As an option, the present magnetic recording medium 1000 may be implemented in conjunction with features from any other approach listed herein, such as those described with reference to the other FIGS. Of course, however, such magnetic recording medium 1000 and others presented herein may be used in various applications and/or in permutations which may or may not be specifically described in the illustrative approaches listed herein. Further, the magnetic recording medium 1000 presented herein may be used in any desired environment. The magnetic recording medium 1000 in various permutations disclosed herein was developed to improve the stability and performance of tape storage media over the required environments for use and storage.

Except as otherwise described herein, the various layers of the magnetic recording medium 1000 may be of conventional construction, design and/or function. In various approaches, a new and novel layer may be used with conventional layers. In further approaches, multiple new and novel layers may be used together with other conventional layers.

Except as otherwise described herein, the various layers of the magnetic recording medium 1000 may be formed using conventional methods, especially where the respective layer is of conventional construction.

The magnetic recording medium 1000 is preferably a magnetic recording tape, but in other aspects is a different type of deformable media.

As shown in FIG. 10, four basic layers are present in the magnetic recording medium 1000. An optional backcoat 1002 is positioned along one side (lower side in the FIG.) of a substrate 1004. An underlayer 1006 is positioned along another side (upper side in the FIG.) of the substrate 1004. A recording layer 1008 is positioned above the underlayer 1006. Additional layers of conventional construction may be present in the magnetic recording medium 1000, in various approaches. For example, the backcoat may be eliminated and multiple layers deposited on both sides of the substrate to allow recording on both sides of the final tape.

Backcoat

The backcoat 1002 may or may not be present in the magnetic recording medium 1000. The backcoat 1002 may be of conventional construction, design and function, and in some approaches may have a conventional composition including a conductive carbon black dispersed in a polymer binder system as commonly practiced in the industry for decades, though, again, any conventional backcoat material may be used. Preferably, the backcoat 1002 is constructed of a material that provides one or more of the following benefits: facilitate separation from another section of the tape would thereover on a spool, tribology improvement, dissipation of static electricity, etc. A preferred thickness of the backcoat 1002 is less than about 0.3 microns, preferably less than about 0.2 microns.

Substrate

The substrate 1004 is preferably of conventional construction, design and function. The substrate 1004 is typically the thickest layer. Illustrative materials for the substrate 1004 include polyethylene terephthalate (polyester or PET), polyethylene naphthalate (PEN), super-tensilised PEN, an aramid-like material (e.g., solubilized para-imide such as one sold under the trade name Mictron™ sold by Toray Industries, Inc. having a place of business at Nihonbashi Mitsui Tower, 1-1, Nihonbashi-Muromachi, 2-chrome, Chuo-ku, Tokyo 103-8666, Japan), etc.

Underlayer

The underlayer 1006 provides one or more of the following functions in the structure: attenuation of magnetic signal passing through the recording layer, adhesion of the recording layer to the substrate 1004, etc. Accordingly, in most approaches described herein, the function of the underlayer 1006 is not to retain any memory of the writer flux, but rather to improve the write flux box coming from the write head element during writing to the recording layer 1008. Moreover, any retained magnetic moment orientation from writing is preferably weak or non-existent so as to minimize noise during readback.

One very important attribute of the magnetic filled coating in the underlayer, according to various approaches, is to quickly absorb the stray field passing through the recording layer above during the very rapid magnetic switching encountered during writing. The ideal underlayer should have a very low remnant moment ($M_r$) so that it retains no orientation after the write field passes through that volume of the underlayer.

In some approaches, the underlayer 1006 is of new and novel construction. The new and novel underlayer 1006 may be present in the medium 1000 with a conventional recording layer 1008 there above, in one aspect. In another aspect, the new and novel underlayer 1006 may be present in the medium 1000 with a new and novel recording layer 1008 there above. In other approaches, the underlayer 1006 is of conventional construction, and is present in the medium 1000 with a new and novel recording layer 1008 there above.

In various approaches, the underlayer 1006 has one or more of the following characteristics, and preferably all of the following characteristics: electrically conductive, weakly magnetic (a bulk magnetic strength in Oersted (Oe) that is less than 200 Oe, and preferably less than 100 Oe. Ideally, the underlayer is coated and calendared prior to formation of the recording layer 1008 thereon to improve the recording layer 1008 interface, as described in more detail below. In a preferred embodiment, the underlayer 1006 has about one tenth the coercivity in Oersteds) of the recording layer 1008 and low remnant magnetization enabling the underlayer 1006 to act as a magnetic field flux absorber without creating signal interference with the recording layer 1008 above it.

The electrically conductive characteristic is operative to reduce corrosion of magnetic heads operating on a tape. Particularly, when a tape is unwound, the separation between the recording layer generates a triboelectric potential and current, which in a dry environment can produce a static discharge, and in a humid environment produce an electro-chemical pathway for head corrosion. Both of these situations are undesirable for tape performance and durability, both believed to be a significant factor in head corrosion. The electrically conductive characteristic of the underlayer 1006 assists in dissipating the charge, e.g., by transporting the charge to a hub coupled to a ground, thereby minimizing charge traveling into the head and consequently lessening the risk of condensed liquid water forming a conductive path between the tape and head surface that provides a path for the electrochemical corrosion of the recording head structures.

The weakly magnetic characteristic reduces the amount of noise contributed by the magnetic fields emanating from the underlayer 1006 and improves the resolution of the written bits in the recording layer above the underlayer.

In approaches where the underlayer 1006 is of conventional construction and typically utilizes low coercivity and low moment particles in the micron size range. The coating is not optimized for a high loading of very small (nano scale) particles. The underlayer in some approaches is constructed with a weakly magnetic iron oxide using a conventional polyester-polyurethane rubbery resin with a poly(vinyl acetate-vinyl alcohol-vinyl chloride) hard resin cured with a poly(isocyanate) as used in earlier tape product formats. However, such conventional coatings were not specifically designed or formulated to be an optimum underlayer for the signal recording layer above it in the final tape.

In preferred approaches, the underlayer 1006 includes a new formulation in which the underlayer 1006 includes particles 1010 which are weakly magnetic but are also electrically conductive and dispersed in a low-stress UV-cured matrix providing good adhesion to the substrate and providing mechanical stability and stress relief to the very thin recording layer above it.

The underlayer 1006 does not need to have a narrow distribution of nanoparticle sizes, in various approaches, though use of small particles improves the surface roughness presented to the recording layer when the recording layer is being applied. Using the novel fabrication processes described herein, the underlayer 1006 is not attacked (swollen by the recording layer during application of the recording layer thereon).

In preferred approaches, the underlayer 1006 includes a new formulation in which the underlayer 1006 includes encapsulated nanoparticles 1010 each comprising at least one magnetic nanoparticle 1012, and preferably only one magnetic nanoparticle 1012, encapsulated by an aromatic polymer 1014. A polymeric binder 1016 binds the encapsulated nanoparticles in the underlayer 1006.

Figure 11:
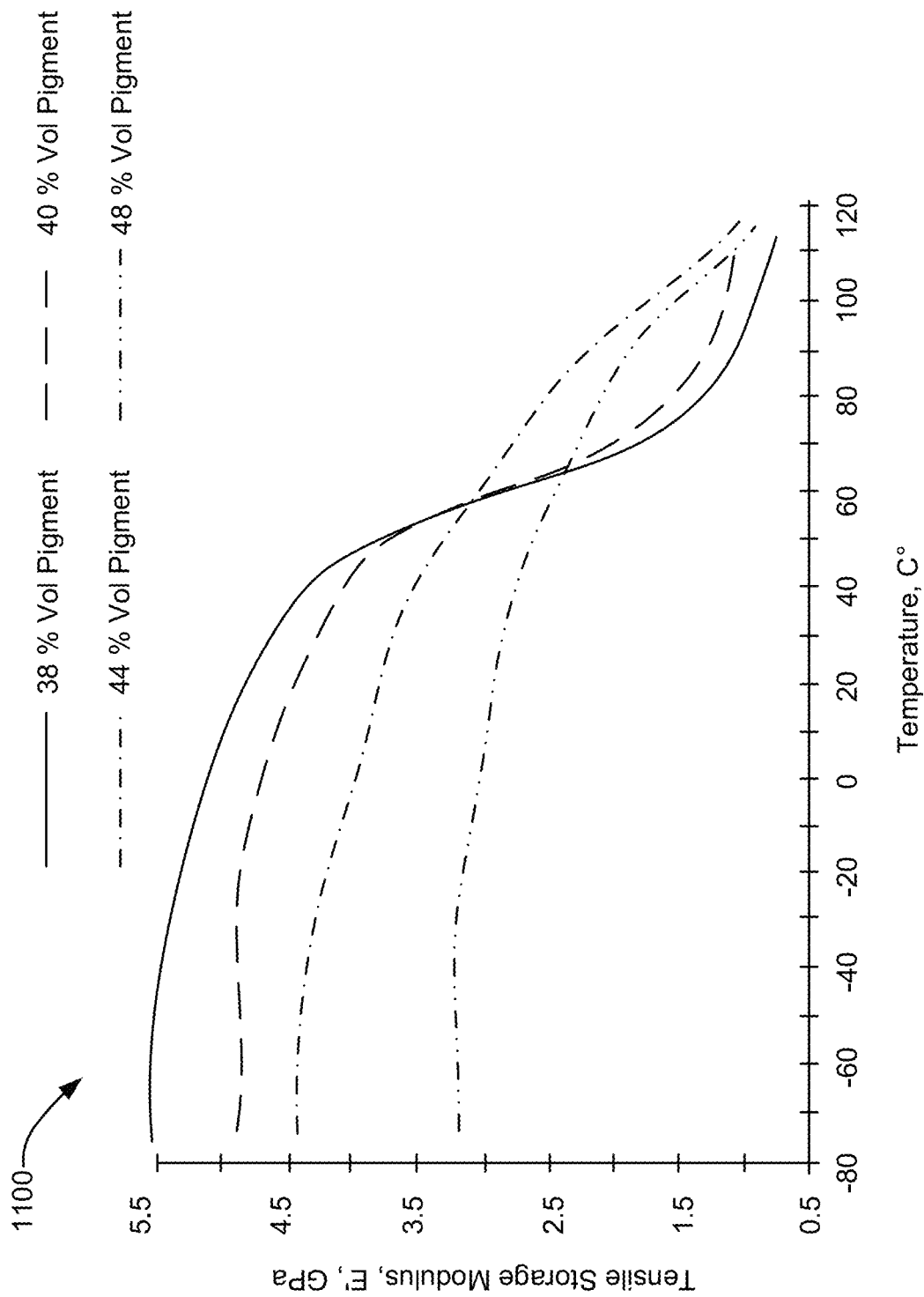
FIG. 11 is a plot depicting Dynamic Mechanical Analysis (DMA) of coatings to determine the Critical Pigment Volume Concentration (CPVC), according to various approaches.

An average concentration of the encapsulated nanoparticles in the underlayer 1006 is preferably at least about 35 vol %, e.g., 40 vol %, 45 vol %, 50 vol %, 55 vol %, 60 vol %, greater than about 60 vol %, in a range of about 40-75 vol %, in a range of about 45-75 vol %, in a range of about 50-75 vol %, in a range of about 35-50 vol %, in a range of about 40-60 vol %, or any other sub-range within the aforementioned ranges. Ideally, the average concentration of the encapsulated nanoparticles does not exceed the critical pigment volume concentration (CPVC) at which the coating would lose its mechanical integrity and no longer function as a viable, durable coating. For nanoparticle filled coatings, a very high surface area can reduce the CPVC dramatically unless a novel encapsulation of the nanoparticles and binder design is implemented to allow a higher CPVC. The CPVC may be determined using Dynamic Mechanical Analysis (DMA) of free films of the coating for a series of coatings with increasing vol % of the filler. Conventional DMA techniques may be used on the novel formulations described herein. The CPVC is determined at the vol % at which the tensile storage modulus (E') reaches its maximum value. FIG. 11 depicts a CPVC DMA plot 1100 for various vol % of pigment in an underlayer, according to various approaches. Such plot 1100 is exemplary of plot(s) which may be generated by one skilled in the art following the teachings herein and using conventional DMA plotting techniques, and without resorting to undue experimentation.

The magnetic nanoparticles preferably include a weakly ferrimagnetic material. By "weakly ferrimagnetic" what is meant is that the magnetic nanoparticles do not have a high coercivity ($H_c$) or magnetic moment ($M_r$), but rather have an average magnetic field strength that contributes a minimal signal during reading of the overlaying recording layer. The final coating ideally presents no detectable noise signal contribution to the observed response for the written bits in the data storage layer.

In preferred approaches, the magnetic nanoparticles have a coercivity ($H_c$) of less than about 200 Oe, more preferably less than 100 Oe, and greater than 50 Oe. An exemplary range of the field strength of the magnetic nanoparticles is 50-200 Oe. The magnetic nanoparticles are also preferably characterized by a low remnant moment, e.g., <12 emu/g.

A preferred material for the magnetic nanoparticles is a chromium dioxide, which is weakly magnetic, electrically conductive, and very hard. In other approaches, the magnetic nanoparticles include one or more of: magnetic metal particles having an oxidized outer surface or oxide thereon (at the cost of conductivity) such as cobalt, nickel or iron, and alloys thereof.

An average diameter of the magnetic nanoparticles is preferably in a range of 2 nanometers (nm) to 20 nm, more preferably 4 nm to 10 nm, depending on the material, though the average diameter could be higher or lower than this range in some approaches. One consideration about average diameter is that the smaller the size, the harder it may be for the binder to properly hold the pigments in the coating matrix. Accordingly, the average diameter of the magnetic nanoparticles should be selected to maintain the critical pigment volume in an acceptable range. If the average diameter is too small, insufficient binder may be present between adjacent particles, making the material brittle and susceptible to breakage. If the particles are too large, the interface between the underlayer 1006 and recording layer 1008 loses the desired smooth characteristic described herein.

In preferred approaches, the magnetic nanoparticles present in the underlayer are weakly magnetic and electrically conductive and are formulated to produce a dried coating with negligible or no swelling by the solvent used to apply the recording layer. The use of nanoparticles in the underlayer is preferred to use of larger particles so as to allow a smoother interface with the recording layer.

The encapsulated nanoparticles in various preferred implementations may have a broad size distribution so long as the resulting dried film does not exceed the critical pigment volume concentration.

Preferably, the majority of the particles in the underlayer 1006 are coated with sufficient binder so as to achieve a cohesive and stable coating with a minimal number of coated clusters of particles or aggregates. The ideal coating would have no clusters or aggregates in the final coating such that close to 100% of the particles are completely dispersed in the binder matrix as individual particles. Good dispersion of the particles into the matrix with minimal orientation of the particles further reduces the noise contribution of the underlayer to the recorded signal in the recording layer.

Also preferably, the encapsulated nanoparticles are not well aligned with each other, e.g., are randomly oriented in the underlayer 1006. This further improves the performance of the underlayer by reducing formation of ordered magnetic regions within the underlayer 1006 which reduces the noise produced in the underlayer 1006. Nonetheless, while it is desirable to generate a monodisperse non-aggregated dispersion of encapsulated particles for the coating preparation, this is not necessary for the underlayer, since the mechanical properties are more important than magnetic signal performance.

The aromatic polymer encapsulating the magnetic nanoparticles may be and/or include any of many different aromatic polymers, as long as the aromatic polymer encapsulates at least about 80% of the surface of the magnetic nanoparticle, preferably at least about 90% of the surface of the magnetic nanoparticle, and ideally approximately 100% of the magnetic nanoparticle in the underlayer 1006. Accordingly, the aromatic polymer forms at least a partial shell, and preferably a full shell, around the magnetic nanoparticles.

The layer encapsulating the nanoparticles can be as thin as a molecular monolayer, e.g., less than 0.4 nm, but a more robust layer is achieved at about 1-2 nm thick. As the layer becomes thicker the packing of the nanoparticles into the coating decreases. This is not as critical the underlayer as it is in the recording layer.

An average thickness of the aromatic polymer encapsulating the magnetic nanoparticles is preferably in a range of about 0.5 nm to about 8 nm, e.g., 1-4 nm, 3-5 nm, 4-5 nm, 4-7 nm, 5-7 nm, etc. but could be slightly higher or lower than these ranges. Thicknesses used herein generally refer to deposition thickness on the underlying structure, unless otherwise noted.

Aromatic polymers are preferred as the encapsulating layer, because the aromatic ring structure(s) that encapsulates the surface of the magnetic nanoparticle. Aromatic rings have a very beneficial behavior, particularly with chemically reactive metal oxides such as chromium oxide, due to the unique characteristic of aromaticity in such molecules which offers improved stability and some magnetic shielding at the surface of the magnetic nanoparticles if properly aligned with the magnetic axes of the magnetic nanoparticles. For example, the aromatic ring structures can act as a magnetic field modifier due to their unique molecular electronic structure and ability to moderate an external magnetic field.

Aromatic polymers also provide magnetic shielding at the surface of the pigment, and help isolate the magnetic nanoparticles from other particles to improve the independent switching of the encapsulated nanoparticles, resulting in higher bit resolution.

A preferred aromatic polymer is a carbamate. A preferred example of an aromatic molecule known to react with chromium dioxide particles to effectively encapsulate and isolate the particles from its neighbors in a close packed matrix is methylene bis diphenyl carbamate. Ideally, the encapsulating polymer is constructed from methylene bis diphenyl carbamate with a functional acrylic polyester as the ester segment for the aromatic carbamate when used with nanoparticles of chromium dioxide. Upon UV irradiation, polymerization on the surface of the particle can proceed to form the encapsulating polymer film layer.

For use with chromium dioxide magnetic nanoparticles in particular, the aromatic polymer is preferably an aliphatic substituted aromatic, e.g., having an oxidizable portion that reacts with chromium, thereby assisting in adsorption of the aromatic polymer to the chromium dioxide microparticle. The benzylic carbon of the diphenyl methane dicarbamate is known to be oxidized efficiently by chromium dioxide to tightly bind the resulting diphenyl ketone to the particle surface.

In other approaches, the aromatic polymer includes reactive functional substituent such as amines, alcohols, carboxylic acids or nitrile groups. An example is cinnamic which is present as a copolymer with styrene to form a bound polymer layer on the nanoparticle surface.

In yet other approaches, the aromatic polymer includes one or more repeating units with substituents capable of chemical adsorption and/or bonding to the particle surface such as amines, a carboxylic acid such as cinnamic acid, and other functional aromatics that will bind with the surface of the magnetic nanoparticle being used.

In an alternative implementation, the encapsulating layer of the encapsulated microparticles is not of a fully aromatic polymer but may be a copolymer such as a polyester polyurethane or acrylic modified polyurethane. Examples include aliphatic polymers of known type, non-aromatic polymers of known type, etc.

The polymeric binder binding the encapsulated nanoparticles together may be and/or include various types of binder material. In preferred approaches, the binder includes an acrylic polymer, e.g., a polymer of acrylic acid or an acrylate, and preferably a functional acrylic polymer. Illustrative acrylic polymers suitable for use as a binder in various approaches include components such as methyl methacrylate, acrylic acid, and others. In general, preferred polymeric binders are those with a number average molecular weight of less than about 2400, and preferably less than about 1200.

In a preferred implementation, the polymeric binder has UV curable functionality to enable binding to the encapsulating layer of the encapsulated microparticles. This functionality can be provided by acrylate groups, vinyl, etc.

In some approaches, the binder includes a vinyl chloride, vinyl acetate-vinyl alcohol copolymers. In yet other approaches, the binder includes polyester or polyether polyurethanes. For the nanoparticle filled coatings the polymers will be much lower molecular weight (size) than previously employed materials. Typically, the useful polymers are less than 20 repeat units in length prior to UV cure.

The relative amounts of encapsulated nanoparticles to binder in the underlayer 1006 should be in a range that is not above the critical pigment volume concentration (CPVC). One skilled in the art, once armed with the novel formulations described herein, would be able to calculate the CPVC using known techniques based on the characteristics of the materials used, such as binder used, particle surface area, etc. A general rule of thumb is less than about 50 vol % pigment (encapsulated nanoparticles) in the underlayer 1006, so that structural integrity of the underlayer 1006 is maintained, along with other functions of the underlayer 1006 such as structurally stabilizing the magnetic layer, enhancing durability of the tape, and providing adhesion of the recording layer 1008. The pigment loading is preferably high enough to provide adequate mechanical integrity as measured with DMA will preserving enough electrical conductivity to mitigate undesirable triboelectric properties.

Additional materials may be present in the underlayer 1006, such as mobile lubricants and/or stabilizers used for dispersion stabilization prior to application and cure.

The resulting underlayer 1006 is preferably characterized by a weakly magnetic, electrically conductive, encapsulated nanoparticle dispersion in a tightly bound binder to the pigment (encapsulated nanoparticles) so as to achieve a dried coating with an onset glass transition temperature Tg in the Tensile Storage Modulus (E') vs. temperature plot from 0° centigrade (C) to 60° C. The Tg should be higher than 35° C., preferably in excess of about 45° C., and an absolute value for E' measured at 10 Hz via DMA at 20° C. of at least about 6 gigapascals (GPa) up to about 16 GPa or slightly higher, e.g., about 8 GPa, about 10 GPa, about 11 GPa, 12 GPa, about 15 GPa, about 16 GPa. The normal operating range for tape, in most approaches, is in the range of 0° C. to 60° C., but could be higher or lower.

Binders used in conventional magnetic recording tapes result in an underlayer 1006 having a glass transition temperature of 20-30° C. This is too soft, resulting in the underlayer 1006 being too pliable during use to provide a stable and consistent recording medium. However, the underlayer 1006 should be sufficiently elastic to remain tough and durable during use and storage. Accordingly, preferred embodiments result in an underlayer 1006 that has an onset Tg as determined by a DMA plot of the E' vs temperature in excess of about 35° C., with the preferred onset Tg of a very broad response that remains in the elastic regime at 10 Hz to at least 50° C.

An average thickness of the underlayer 1006 is less than 1 micron and preferably less than about 0.6 microns. Lower thicknesses are preferred to allow more tape to be wound into the fixed volume of a given tape cartridge.

In preferred approaches, no wear particles are present in the underlayer 1006, and ideally, no wear particles are present in the product at all. Wear particles, conventionally added for purposes of cleaning the tape head and/or reducing stiction, have been found to constitute an increasingly intolerable defect and source of damage to the shrinking read and write structures in current and future recording heads. However, in other approaches, wear particles may be present in the underlayer 1006.

The underlayer 1006 is preferably applied to the substrate 1004, at least partially dried, and cured prior to application of the magnetic recording layer 1008 to minimize interlayer turbidity. Accordingly, in preferred approaches, the recording layer 1008 is substantially not intermixed with the underlayer 1006 (and vice versa). This feature overcomes a longstanding problem in magnetic recording tape products.

Figure 12:
FIG. 12 is a transmission electron microscope (TEM) image of a cross section of a conventional recording tape.

Referring to FIG. 12, there is shown a TEM image of a cross section of a conventional recording tape 1200. As shown, the interface between the recording layer and the underlying underlayer is clearly defined. The light particles in the recording layer are barium ferrite particles. As shown, the barium ferrite particles are not monodisperse, nor tight-packed in the recording layer. Moreover, voids are present where there are no particles. In addition, the interface between the recording layer and underlayer is quite rough. Ideally, magnetic fields would pass from a writer perfectly perpendicular through the recording layer. Unfortunately, magnetic fields expand, or curve, upon leaving writer, with the curvature being more pronounced the farther it is from the pole tip of the writer. The voids, undulating interface between the recording layer and underlayer, and nonuniform dispersion of the magnetic particles all compound the effects of the expanding writer field. Where a transition is written (e.g., write field directed down, then up as the tape moves past the writer), and the field is expanding, say 10-20% as it passes through the recording layer, the transition is not sharp, reducing the resolution of the tape. During readback, the transition is noisy because it is not sharp. A 1 dB improvement in the signal to noise ratio (SNR) during readback is a significant achievement. The inventor believes an improvement of up to 5 or 6 dB in the signal to noise ratio (SNR) during readback can be achieved using the new and novel recording layer described herein formed upon a cured underlayer whereby interlayer turbidity is minimized.

In preferred approaches, the upper surface of the underlayer is substantially flat, with a modulation of less than about 25% of the thickness of the interfacial boundary as imaged in the TEM cross section of the final tape coating, preferably less than about 5%, e.g., like the upper surface of the recording layer shown in FIG. 12.

Process for Fabricating Underlayer

A method for fabricating the underlayer 1006, e.g., of a magnetic recording medium, in accordance with various approaches, is presented below. As an option, the present method may be implemented to fabricate underlayers 1006 such as those described above. Of course, however, this method and others presented herein may be used to form underlayers 1006 which may or may not be related to the illustrative aspects listed herein. Further, the methods presented herein may be carried out in any desired environment. Moreover, more or less operations than those described below may be included in the method, according to various approaches. It should also be noted that any of the aforementioned features may be used in any of the approaches described in accordance with the various methods.

The method generally includes forming an underlayer 1006 that has encapsulated nanoparticles each comprising at least one magnetic nanoparticle encapsulated by an aromatic polymer, and a polymeric binder binding the encapsulated nanoparticles.

Encapsulated nanoparticles may be purchased, or fabricated. For example, in some approaches, commercially available encapsulated nanoparticles usable for medical imaging and drug delivery applications may be used.

In one approach, forming the underlayer 1006 includes mixing the polymeric binder with the encapsulated nanoparticles and a solvent (solvent system) to form a mixture. The relative amounts of encapsulated nanoparticles and binder are preferably selected to provide characteristics listed in the previous section. For example, the mixing includes ultrasonically dispersing the encapsulated nanoparticles into the polymeric binder and solvent, thereby creating a radiation-curable emulsion in the solvent.

Conventional coating methods would require formulation to achieve a useful viscosity and likely require much higher molecule weight binders than would be optimal for the target design for the present advanced tape construction. As a result, what are described herein are examples of formulations not suitable for conventional coating. All of the examples are best applied to the substrate as a sprayed-on aerosol coating, though other coating methods are contemplated.

In general, the solvent used herein should provide one or more, and preferably all, of the following characteristics: the solvent causes the polymeric binder to swell, but allows the polymers to collapse around the pigment rather than shrinking during drying. The solvent causes the chain of the polymeric binder to uncoil and move toward its theta condition (minimum free volume).

The layer is most stable when the polymeric binder is in theta condition, and it is at this point where the curing should occur. UV curing is preferred when the polymeric binder is close to its theta condition due to the speed at which curing occurs.

One of the solvent components should be a good solvent for the binder additive, and helps suspend the polymer encapsulated magnetic particles. The second solvent may be a non-solvent for the polymeric binder. As the 'good' solvent phase evaporates, the remaining coating moves closer to a non-solvent dominated coalescing coating. The second solvent-rich coating thus passes through a point in the drying process in which the binder and encapsulated magnetic particles are about at their minimum free volume or theta conditions. This produces a minimal residual stress in the final, dried coating. This in turn eliminates curl and cupping in the final tape.

A preferred solvent is a water and tetrahydrofuran (THF) solvent system in relative concentrations that render the solvent system almost completely azeotropic. This solvent system is preferred for use with acrylic polymer binders, as it dries well, is environmentally friendly, takes less energy, and is less sensitive to combustion or explosion as an azeotrope. The THF/water solvent is also preferred because the THF leaves first while drying, followed by the water, which assists in maintaining the binder toward theta condition. Particularly, the THF leaves first due to its higher volatility than water. Exit of the organic solvent first allows the coalescence of the film to collapse and reduce the stress. Water then dominates the solvent interface, thereby allowing the polymer to approach theta conditions.

Only a slight increase in the fraction of water over the azeotropic mixture concentrations of (e.g., 6.7 mass percent) is needed to provide optimum coating drying. The results in solvent mixture in the range of 7-8% water in 92-93% THF drying at 64° C. This lower drying temperature has the added benefit of reducing operating costs compared to current magnetic tape coating processes.

The resulting mixture (pigment+solvent) is applied onto a structure, such as the substrate 1004. Any suitable technique may be used to apply the mixture. Where the mixture of pigment and solvent form an emulsion, a preferred technique is spray coating, which provides fast, uniform application without streaks typical of brush coating or chunks typical of blade coating. Other application techniques include blade coating, slot-die coating, use of gravure rolls, etc.

In another approach, forming the underlayer 1006 includes mixing the polymeric binder with the encapsulated nanoparticles to form a micro-suspension without the addition of dispersants or other additives to create a stable dispersion.

The applied mixture is dried to remove at least some of the solvent, or substantially fully dried. For example, the applied mixture may be dried so the more volatile organic solvent (e.g., THF) is removed, thereby increasing the non-solvent content in the drying film. The polymeric binder collapses between the encapsulated microparticles as the solvent is removed during the drying. For example, in one aspect in which the binder is hydrophobic, the last solvent to leave the applied mixture is water, a non-solvent for the binder, which thus forces the hydrophobic binder to collapse onto the pigments. This also minimizes the residual stress in the dry coating, thereby preventing such things as tape curling. The drying is preferably performed using forced air under low temperature (less than about 75° C.) conditions.

The partially dried coating which will eventually provide the underlayer for the magnetic recording layer may be cured using, e.g., a thermal-induced chemical reaction to cure the two layers, a radiation-induced chemical reaction to cure the two layers, etc. For example, UV light or other known radiation exposure is applied to cause crosslinking of the polymeric binder. If proper solvent selection is employed for both coatings, the cure step results in minimal stress between the two layers and results in a stable (flat) coating.

In the case of thermal-induced cure, a chemical reaction may be used to reduce solvent swelling in the coating as well as improve the mechanical properties of the cured coating. Chemical cure in a dry film is slow and inefficient in achieving the desired uniformity of a cured highly filled coating. The preferred approach is to use radiation-induced chemical cure. Fortunately, all current and future magnetic recording layers employed for tape applications are now thin enough to allow efficient movement of light through the coating and effect chemical reactions within the binder-rich regions which are the target of such cure reactions. It is well known that ultraviolet (UV) radiation can activate the formation of free radicals which can attack unsaturated carbon bonds such as olefins, vinyls and acrylates to initiate polymerization of these reactive species to form more rigid molecular structures. UV curing is also preferred, as the underlayer 1006 may also bind to some substrates 1004 during free radical formation, thereby improving durability of the tape.

After curing the underlayer 1006, a magnetic recording layer 1008 is formed on or above the underlayer 1006. By drying and curing the underlayer 1006 before forming the magnetic recording layer 1008 of any type thereon, interlayer turbidity at the interface between the underlayer and the recording layer is minimized. This overcomes a problem that has been prevalent in conventional magnetic recording tape manufacture, resulting in a limit on the achievable areal recording density of the tape.

In one exemplary approach, nanoparticles of a weakly magnetic material (chromium dioxide) are coated with an aromatic polymer shell (methylene bis diphenyl carbamate with a functional acrylic polyester as the ester segment for the aromatic carbamate) and bound together with a functional acrylic polymer. A formulation of the foregoing materials is dispersed using ultrasonic dispersion methods into an ultraviolet (UV) curable emulsion in a tetrahydrofuran (THF) and water solvent system, applied above the substrate 1004, dried, and cured. The dried coating has the pigment encapsulated with the aromatic glassy polymer such that the matrix is highly filled with the magnetic and electrically conductive pigment to over 40% while maintaining an elastic, rubbery interparticle matrix formed from the polyester-acrylate regions of the carbamate binder.

Process for Fabricating Encapsulated Magnetic Nanoparticles

In various approaches, the base magnetic nanoparticles, to be encapsulated later using any of the novel processes disclosed herein, are prepared using known techniques, e.g., milling. In other approaches, the base magnetic particles are obtained in ready-to-use form and encapsulated using any of the novel processes disclosed herein.

The formation of encapsulated magnetic nanoparticles may be performed using various techniques. Prior approaches to encapsulate magnetic nanoparticles have proven unsuccessful. Rather than attempt to maintain isolation of the encapsulated nanoparticle precursors (not yet converted to the final magnetic state by high heat conversion), in preferred approaches, the magnetic nanoparticles are mixed with an organic solvent in which an aromatic dispersant is present. Absorption of the aromatic species onto the nanoparticles allows a stable suspension of the particles in the initial solvent, such as toluene which is a good solvent for many appropriate aromatic dispersants. The mixture is heated with ultrasonic dispersion energy applied to maintain the suspension. A high boiling aromatic hydrocarbon such as anthracene, phenanthrene, pyrene, etc. is added to the approximate volume of toluene prior to distillation. The mixture is heated above the boiling point of toluene and the toluene distilled away leaving a molten suspension of the dispersed nanoparticles in the fully aromatic polyaromatic melt, such as molten phenanthrene, which melts above 380° C.

In one illustrative approach, the mixture is heated in a pressure vessel to allow the temperature to be raised to 400° C. and held for four to six hours. The iron nanoparticles are converted to the magnetic epsilon form of iron oxide. In this process the magnetic particles remain encased in a fully aromatic shell.

The mixture is then cooled to room temperature before processing to extract the encapsulated particles is carried out. Once cooled to room temperature, the waxy solid with the dispersed nanoparticles is dissolved in a solvent such as toluene to once again obtain a dispersion of the nanoparticles in the mixed aromatic solvents. To this is now added sufficient chloroform or the like to allow the aromatic layer to separate and be decanted from the particles suspended in chloroform.

Dry particles can be recovered by distillation of the chloroform or a suspension maintained by solvent exchange into water to form an emulsion if the aromatic encapsulation layer is modified so as to have sufficient residual polar functionality so that allows stable dispersion into water.

Recording Layer

In some approaches, the recording layer 1008 is of new and novel construction. The new and novel recording layer 1008 may be present in the medium 1000 with a conventional underlayer 1006 therebelow, in one aspect. In another aspect, the new and novel recording layer 1008 may be present in the medium 1000 with a new and novel underlayer 1006 therebelow. In other approaches, the recording layer 1008 is of conventional construction, and is present in the medium 1000 with a new and novel underlayer 1006 therebelow.

In approaches where the recording layer 1008 is of conventional construction, a dispersion of weakly magnetic particles dispersed in a binder system which does not attempt to encapsulate the particles in a glassy encapsulating layer prior to dispersion may be used as the flux dissipation layer as has been practiced in the construction of current tape media for over a decade. These underlayers may or may not have additional particles added for conductivity or abrasive strength improvement.

In preferred approaches, the recording layer 1008 includes a new formulation in which the recording layer 1008 includes encapsulated nanoparticles 1018 each comprising at least one magnetic nanoparticle 1020, and preferably only a single magnetic nanoparticle 1020, encapsulated by an encapsulating layer 1022, and a polymeric binder 1024 binding the encapsulated nanoparticles. In general, the magnetic strength of the magnetic nanoparticles in the recording layer 1008 is significantly greater than the magnetic strength of nanoparticles in the underlayer 1006, if present.

An average concentration of the encapsulated nanoparticles in the recording layer 1008 is preferably at least about 35% by weight (wt %), e.g., about 45-50% wt %, in a range of about 35-50 wt %, preferably in a range of about 46-50 wt %, or any other sub-range within the aforementioned ranges.

The magnetic nanoparticles in the encapsulated nanoparticles of the recording layer 1008 may be constructed of any magnetic material suitable for the intended application, such as magnetic recording. Moreover, magnetic materials usable in magnetic imaging may be used in the magnetic nanoparticles in some approaches. In various approaches, the magnetic nanoparticles include at least one magnetic material selected from the group consisting of: alloys and/or oxides of nickel, cobalt, and iron including mixed compounds and crystals using combinations of nickel, cobalt, and iron such as: iron-barium, NiFe, barium ferrite, and cobalt platinum.

It should be noted that the approach described herein is applicable to other nanoparticles currently not typically useful for tape storage layers such as MnAl and even non-magnetic dispersions which could benefit from improved control of the coating integrity such as SiC and $SiO_2$ dispersions useful in sand papers and other abrasives. Accordingly, any known type of magnetic nanoparticle may be used in various approaches.

In preferred approaches, the magnetic nanoparticles include at least one magnetic material selected from the group consisting of: $Co_3O_4$, CoFe, $Fe_3O_4$, alpha iron oxide ($\alpha$-$Fe_2O_3$), epsilon iron oxide ($\varepsilon$-$Fe_2O_3$), and Co(fcc). In other approaches, the magnetic nanoparticles may include manganese aluminum alloys, oxides of magnetic metals, and pinel ferrites.

An average diameter of the magnetic nanoparticles in the recording layer 1008 is preferably in a range of about 2 nm to about 20 nm, preferably in a range of about 2 nm to about 10 nm, especially for the epsilon iron oxide particles. The average diameter could be higher or lower than this range in depending on the size at which the magnetic nanoparticle loses its remanence and becomes superparamagnetic. In general, a smaller average diameter is better for purposes of increasing bit resolution.

Preferably, the encapsulated nanoparticles used in the recording layer have the same composition, crystal structure and morphology as well as a very narrow particle size range to optimize the final recording layer response to an applied external field during data writing. In preferred approaches, greater than about 80% of the encapsulated nanoparticles have only a single magnetic nanoparticle therein, more preferably greater than about 90, even more preferably greater than about 98%, and ideally at least about 100% of the encapsulated nanoparticles have only a single magnetic nanoparticle therein.

The aromatic polymer encapsulating the magnetic nanoparticles may be and/or include any of many different aromatic polymers, as long as the aromatic polymer encapsulates at least about 75% of the surface of the magnetic nanoparticle, preferably at least about 90% of the surface of the magnetic nanoparticle, and ideally approximately 100% of the magnetic nanoparticle in the underlayer 1006 and especially for optimization of the magnetic nanoparticles in the recording layer. In the recording layer, the efficiency of the particle encapsulation should be as close to 100% as can be obtained by a viable process used to construct large quantities in practice. Accordingly, the aromatic polymer forms at least a partial shell, and preferably a full shell, around the magnetic nanoparticles. An average thickness of the aromatic polymer encapsulating the magnetic nanoparticles is preferably less than 1 nm in the final recording layer 1008. Preferably, the average thickness of the aromatic polymer shell is in a range of about 0.5 nm to about 1 nm, e.g., 0.5-0.75 nm, 0.6-0.8 nm, 0.7-1 nm, 0.8-1 nm, etc. but could be slightly higher or lower than these ranges. In some instances, clusters or aggregates of partially coated nanoparticles may be formed during the encapsulating process which may persist through the formulation process into the final coating. So long as these clusters and aggregates are not a significant fraction of the coating (e.g., less than 10% by volume) and smaller than the final coating thickness so as not to impart surface roughness and defects (e.g., <60% the thickness of the final dried coating in diameter) the presence of clusters and aggregates should not be limiting on the desired functionality of the layer.

In embodiments where the encapsulated nanoparticles are pyrolyzed, the average thickness of the resulting carbon shell is in a range of about 0.05 nm to about 1 nm.

Such thin shells improve magnetic particle packing density in the recording layer 1008, and thus enable higher recorded bit resolution.

Aromatic structures are preferred as the encapsulating layer for the isolation of magnetic nanoparticles due to their unique electronic properties which provide some weak but significant separation of each nanoparticle from the magnetic field coupling them with their near neighbors in the final close-packed dry coating.

The aromatic polymer preferably includes functional groups that have an affinity to adhesion to iron oxide where iron magnetic nanoparticles are used. Illustrative functional groups include carboxylate functional groups, nitrile functional groups, and others.

A preferred aromatic polymer is a radiation curable substituted aromatic polymer. In another approach, the aromatic polymer is a styrene, such as polystyrene. Ideally, the aromatic polymer is polystyrene with a copolymer which has a rubbery polymer chain in the para-position on the styrene monomer. Preferably, the encapsulating layer includes a polyaromatic film.

In other approaches, the aromatic polymer is one that is a known precursor usable for creating graphite, carbon fiber, carbon nanotubes, etc. Accordingly, the encapsulating layer may be a graphite-like dominated continuous film.

The polymeric binder binding the encapsulated nanoparticles together may be and/or include various types of binder material.

Contemplated approaches attempted to incorporate encapsulated magnetic nanoparticles into conventional binder systems, but it was found that such approaches result in recording layers that have far more noise and much poorer signal performance than would be predicted from the assumption that the particles are smaller and more packed into an oriented film. While the reason for such poor performance in approaches using conventional binder systems is not completely understood, the inventor has found that the novel techniques described herein result in a new recording layer that exhibits excellent recording performance, far superior to said approaches using conventional binder systems.

In preferred approaches, the binder includes an acrylic polymer, e.g., a polymer of acrylic acid or an acrylate, and preferably a functional acrylic polymer. In particularly preferred approaches, the polymeric binder includes a radiation curable rubbery acrylic polymer. Illustrative acrylic polymers suitable for use as a binder in various approaches include acrylic terminated polyester, and those that include components such as methyl methacrylate, acrylic acid, and others. For example, the binder may include an acrylic terminated aliphatic polyester or aliphatic polyether polymer. In general, preferred polymeric binders are those with a number average molecular weight of less than about 2400, and preferably less than about 1200.

The binder used in the recording layer 1008 may be the same as, or different than, the binder used in the underlayer 1006, in various approaches.

The recording layer 1008 should be flexible (rubbery) over the in-use operating temperature range, while providing tear resistance and shock resistance. Accordingly, preferred embodiments result in a recording layer 1008 that has a glass transition temperature in excess of about 35° C., preferably in excess of about 45° C., and ideally at least about 50° C. This can be achieved via selection of the binder.

Additional materials may be present in the recording layer 1008, such as lubricants. However, one benefit of various approaches disclosed herein is that they allow the elimination of conventional additives such as wear particles to the recording layer.

An average thickness of the recording layer 1008 as measured perpendicular to the plane of formation thereof is less than about 0.2 microns, and preferably less than about 0.1 micron. One benefit of this thickness of recording layer 1008 is that the UV light is able to reach all portions of the recording layer 1008 even with the pigment therein, thereby ensuring a fast, consistent cure throughout the layer. Conventional recording layers, being thicker, were unable to be UV cured, and therefore relied upon other types of curing that were not as fast. Accordingly, as the conventional tape was formed, curing continued as the tape was wound onto a spool. However, winding the tape onto the spool created tensions and stresses (e.g., radial compression) throughout the tape, resulting changes in the mechanical characteristics of the tape that varied from the tape at the inside of the hub to the tape at the outside of the hub.

Where the recording layer 1008 is formed directly on an underlayer 1006, the recording layer 1008 is preferably applied after curing of the underlayer 1006 to minimize interlayer turbidity. Accordingly, in preferred approaches, the recording layer 1008 is substantially not intermixed with the underlayer 1006 (and vice versa).

Preferably, the underlayer 1006 has a bulk magnetic field strength in Oe that is less than 200 Oe, and preferably less than 100 Oe. The underlayer 1006 may have similar construction and/or characteristics as the underlayers disclosed elsewhere herein.

In some aspects, lubricant molecules 1030 are coupled to a surface of the recording layer 1008. The lubricant molecules may be bound to the surface, embedded in the surface, or both. Preferably, the amount of the lubricant molecules along the surface of the recording layer 1008 is less than an amount that would form a continuous lubricant film along the surface of the recording layer 1008.

In preferred approaches, no wear particles are present in the recording layer 1008, and ideally, no wear particles are present in the product at all. However, in other approaches, wear particles may be present in the recording layer 1008 and/or pass therethrough from an underlayer 1006. It is expected that the foregoing mechanical design of the recording layer 1008 with an electrically conductive underlayer 1006 will achieve the desired low friction and head corrosion properties of the tape surface without the need for the inclusion of wear particles, which constitute an increasingly intolerable defect and source of damage to the shrinking read and write structures in current and future recording heads.

Process for Fabricating Recording layer

A method for fabricating the recording layer 1008, e.g., of a magnetic recording medium, in accordance with various approaches, is presented below. As an option, the present method may be implemented to fabricate recording layers 1008 such as those described above. Of course, however, this method and others presented herein may be used to form recording layers 1008 which may or may not be related to the illustrative aspects listed herein. Further, the methods presented herein may be carried out in any desired environment. Moreover, more or less operations than those described below may be included in the method, according to various approaches. It should also be noted that any of the aforementioned features may be used in any of the approaches described in accordance with the various methods.

The method generally includes forming a magnetic recording layer 1008 having encapsulated nanoparticles each comprising at least one magnetic nanoparticle encapsulated by an aromatic polymer, and a polymeric binder binding the encapsulated nanoparticles.

In one approach, forming the recording layer 1008 includes heating the magnetic nanoparticles and aromatic polymer to a temperature that results in a suspension of the magnetic nanoparticles in the aromatic polymer. In general, for most aromatic polymers, the temperature is in a range of about 200 degrees Celsius to about 538 degrees Celsius, depending on the aromatic polymer used.

Where the aromatic polymer has a simple aromatic structure, a temperature of less than 200 degrees Celsius may be used. The relative amounts of magnetic nanoparticles and aromatic polymer in the suspension are preferably selected to provide characteristics listed in the previous section, as well as to avoid creating clusters of nanoparticles.

An organic solvent may be mixed with the nanoparticles and aromatic polymer to create a suspension that prevents clustering and sintering of the nanoparticles. Such solvents may include molten aromatic solvents such as phenanthrene. Preferably, the solvent is one that does not result in oxidative reactions with the magnetic nanoparticles. Toluene or the like may also be added to shift the mixture more toward an emulsion.

In some approaches, the encapsulated particles are pyrolyzed, resulting in a magnetic nanoparticle that is encapsulated in a carbon shell.

The warm suspension of magnetic nanoparticles and aromatic polymer is mixed with a polymeric binder and a solvent to form a mixture. Ultrasonic dispersion is preferably used to create an emulsion. This technique of encapsulated nanoparticle synthesis and polymer encapsulation beneficially eliminates the need for milling and redispersion from aggregated clusters of particles, as is typical in conventional fabrication techniques.

In general, the solvent mixture should provide one or more, and preferably all, of the following characteristics: the most volatile solvent (first to leave during drying) causes the polymeric binder to swell, the second or last solvent to leave during drying is ideally a poor solvent for the binder so that during drying the solution passes through theta conditions for that binder and forces the binder to collapse around the pigment, rather than shrinking during drying which results in undesirable stress in the final coating. The last solvent to leave during drying, being a non-solvent for the binder, forces the swollen chains to coil into their minimum free volume state, referred to as the theta condition, as it passes from being well solvated by the first solvent to being encased in a non-solvent rich environment during drying. The layer is most stable when the polymeric binder is in theta condition, and it is at this point where the curing should occur. UV curing is preferred when the polymeric binder is close to its theta condition due to the speed at which curing occurs.

A preferred solvent is a water and THF solvent system in relative concentrations that render the solvent system predominately azeotropic with a slight excess of water to force the final drying coating to pass through theta conditions during drying. The THF leaves first due to its higher volatility than water. Exit of the organic solvent first allows the coalescence of the film to collapse and reduce the stress. Water then dominates the solvent interface, thereby allowing the polymer to approach theta conditions.

In other approaches, the system may be dominated by water such that the coating is a true emulsion, with the absorbed binder acting as an emulsifier as well as providing the rubber phase resin in the final coating. In further approaches, the useful solvents may include mixtures of volatile polar organics with higher boiling non-solvents for the binders like MEK/Toluene, Acetone/Methyl Isobutyl Ketone, etc.

The resulting emulsion/solvent is applied onto a structure, such as the aforementioned underlayer 1006, or another substrate. Any suitable technique may be used to apply the emulsion/solvent. A preferred technique is specially designed low pressure high volume spray coating, which provides fast, uniform application without streaks typical of brush coating or thickness variations and modulation of the interfaces that result from high shear blade or die extrusion coating methods for these very thin coatings.

The applied mixture is partially dried to remove at least some of the solvent, or substantially fully dried. The polymeric binder collapses onto the encapsulated microparticles as the solvent is removed during the drying. For example, in one aspect in which the binder is hydrophobic, the last solvent to leave the applied mixture is water, a non-solvent for the binder, which thus forces the hydrophobic binder to collapse onto the pigments. This also minimizes the residual stress in the dry coating. The drying is preferably performed using forced air under low temperature (less than about 75° C.) conditions.

The at least partially dried applied mixture is cured to restrict further expansion or contraction in the as-coated, stress-relieved layers during subsequent processing and exposure to environmental stresses to create a thin, high density recording layer 1008 having close-packed magnetic nanoparticles. In one approach, the at least partially dried applied mixture is irradiated. For example, UV light or other known radiation exposure is applied to cause crosslinking of the polymeric binder. In another approach, a different curing process is performed, such as by heating to increase reaction of thermally reactive functional groups in the encapsulated nanoparticle layer with the rubbery binder phase of the dried film.

As an option, lubricant may be added during formation of the recording layer 1008, the lubricant molecules 1030 eventually becoming coupled to a surface of the recording layer 1008 upon formation of the recording layer 1008. The lubricant molecules may be bound to the surface, embedded in the surface, or both. Again, preferably, an amount of the lubricant molecules along the surface of the recording layer 1008 is less than an amount to form a continuous lubricant film along the surface of the recording layer 1008. In one illustrative approach, the lubricant molecules are positioned apart, on average, center to center, a distance in a range of about 2 to about 15 molecular radii along the surface of the recording layer 1008.

In one approach, lubricant molecules 1030 are dispersed in the organic solvent phase and are carried to the surface during drying where they are grafted to the surface during the curing so that they form a stable low friction layer without movement of the lubricant molecules to the drive bearing and head surfaces. This in turn reduces head contamination.

In other approaches, a lubricant is applied to the outer surface of the completed recording layer 1008.

In one illustrative example, a predominantly monodisperse suspension of magnetic nanoparticles such as $Co_3O_4$, CoFe, $Fe_3O_4$, or Co(fcc) encapsulated with an aromatic polymer is combined with a rubbery polymer with radiation-curable end groups and side chains of sufficient chain length to provide a rubbery phase when bounded during cure to radiation curable end groups on the aromatic encapsulating layers of the dispersed nanoparticles. The resulting suspension is used to construct a close packed, thin recording layer 1008 in which a high density recording can be recorded. The rubbery chain attached to the aromatic encapsulating layer is terminated with an acrylic or methacrylic functional group capable of being UV cured to form a highly crosslinked matrix in which the magnetic particles are fully encapsulated by an aromatic glassy polymer held into a cohesive coating through swelling of the rubbery phase, e.g., acrylic terminated low molecular weight polyester added to the solvent. UV curing of the solvent-swollen coating and polyester is carried out during drying.

Relative to current magnetic recording media, various benefits of a magnetic recording tape having the new underlayer and new recording layer thereon include, but are not limited to, one or more of: thinner recording layer, more uniform magnetic particle dispersion, smoother, less turbid interface between the underlayer and recording layer, higher glass transition temperature, lower occurrence or essential elimination of voids of magnetic particles in the recording layer, etc. Each of these benefits results in a magnetic recording tape that exhibits characteristics such as, but not limited to, one or more of: higher dimensional stability, greater tear resistance, higher recording resolution down to and below 1 nm, lower noise resulting in a higher signal to noise ratio, etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising: forming a magnetic recording layer having:
    encapsulated nanoparticles each comprising a magnetic nanoparticle encapsulated by an encapsulating layer, and a polymeric binder binding the encapsulated nanoparticles, wherein forming the recording layer includes spray coating a mixture of the unencapsulated magnetic nanoparticles, an aromatic polymer, and the polymeric binder onto a structure.

2. A method, comprising: forming a magnetic recording layer having:
    encapsulated nanoparticles each comprising a magnetic nanoparticle encapsulated by an encapsulating layer, and a polymeric binder binding the encapsulated nanoparticles, wherein forming the recording layer includes heating the magnetic nanoparticles and an aromatic polymer to a temperature of at least 200 degrees Celsius; mixing the polymeric binder with the heated magnetic nanoparticles, the aromatic polymer, and a solvent to form a mixture; applying the mixture onto a structure; at least partially drying the applied mixture; and radiating the at least partially dried applied mixture for causing crosslinking of the polymeric binder.

3. A method, comprising: forming a magnetic recording layer having:
    encapsulated nanoparticles each comprising a magnetic nanoparticle encapsulated by an encapsulating layer, and a polymeric binder binding the encapsulated nanoparticles, wherein forming the recording layer includes radiating a mixture comprising the magnetic nanoparticles and an aromatic polymer for causing the aromatic polymer to crosslink, thereby forming the encapsulating layer around the magnetic nanoparticles.

4. A method, comprising: creating a suspension of magnetic nanoparticles and an aromatic polymer; mixing the suspension with a polymeric binder and a solvent to form a mixture; applying the mixture onto a structure; at least partially drying the applied mixture; and curing the applied mixture, wherein creating the suspension includes heating unencapsulated magnetic nanoparticles and the aromatic polymer to a temperature of at least 200 degrees Celsius.

5. A method, comprising: creating a suspension of magnetic nanoparticles and an aromatic polymer; mixing the suspension with a polymeric binder and a solvent to form a mixture; applying the mixture onto a structure; at least partially drying the applied mixture; and curing the applied mixture, wherein the magnetic nanoparticles are unencapsulated in the suspension.

* * * * *